(12) United States Patent
Otagaki et al.

(10) Patent No.: US 10,289,889 B2
(45) Date of Patent: May 14, 2019

(54) PATTERN LAYOUT OF TOUCH SENSOR

(71) Applicant: SEMICONDUCTOR COMPONENTS INDUSTRIES, LLC, Phoenix, AZ (US)

(72) Inventors: Takayasu Otagaki, Gifu (JP); Kazuyoshi Ishikawa, Oizumi-machi (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 17 days.

(21) Appl. No.: 15/600,415

(22) Filed: May 19, 2017

(65) Prior Publication Data

US 2018/0336387 A1 Nov. 22, 2018

(51) Int. Cl.
  *G06K 9/00* (2006.01)
  *G06F 3/044* (2006.01)
  *G06F 3/041* (2006.01)

(52) U.S. Cl.
  CPC ........... *G06K 9/0002* (2013.01); *G06F 3/044* (2013.01); *G06F 3/0418* (2013.01); *G06F 2203/04102* (2013.01); *G06F 2203/04103* (2013.01); *G06F 2203/04107* (2013.01)

(58) Field of Classification Search
  None
  See application file for complete search history.

(56) References Cited

U.S. PATENT DOCUMENTS

| 7,864,503 B2* | 1/2011 | Chang ................. G06F 3/044 200/269 |
| 8,013,262 B2* | 9/2011 | Honmatsu ............ G06F 3/0213 200/5 A |
| 8,243,225 B2* | 8/2012 | Kai ....................... G06F 3/0414 349/12 |
| 9,304,642 B2* | 4/2016 | Kim ....................... G06F 3/044 |
| 9,971,924 B2* | 5/2018 | Lee ...................... G06K 9/0002 |
| 2004/0070195 A1* | 4/2004 | Nelson ................. B42D 3/123 283/83 |
| 2008/0138589 A1* | 6/2008 | Wakabayashi ........ H01H 13/83 428/195.1 |
| 2008/0220210 A1* | 9/2008 | McLean ................ C25B 13/00 428/135 |
| 2009/0219258 A1* | 9/2009 | Geaghan ............... G06F 3/045 345/173 |
| 2012/0062510 A1* | 3/2012 | Mo ........................ G06F 3/044 345/174 |
| 2013/0004709 A1* | 1/2013 | Mizuno ................. G06F 3/044 428/138 |

(Continued)

Primary Examiner — Hadi Akhavannik
(74) Attorney, Agent, or Firm — Ramey & Schwaller, LLP

(57) ABSTRACT

In accordance with at least one embodiment, a touch sensor is disclosed. The touch sensor includes a first electroconductive pattern including at least two electrodes. The touch sensor further includes a second electroconductive pattern configured to mask a portion of the first electroconductive pattern when positioned over or under the first electroconductive pattern. The second electroconductive pattern masks the portion of the first electroconductive pattern such that an unmasked portion of the first electroconductive pattern includes unmasked portions of the at least two electrodes. The unmasked portions are of approximately equal length.

14 Claims, 17 Drawing Sheets

(56) References Cited

U.S. PATENT DOCUMENTS

| | | | | |
|---|---|---|---|---|
| 2014/0138125 A1* | 5/2014 | Iwase | ................... | H05K 1/092 |
| | | | | 174/251 |
| 2014/0140588 A1* | 5/2014 | Chou | ................... | G06K 9/0002 |
| | | | | 382/124 |
| 2016/0117005 A1* | 4/2016 | Osawa | ............... | H03K 17/9622 |
| | | | | 345/173 |

* cited by examiner

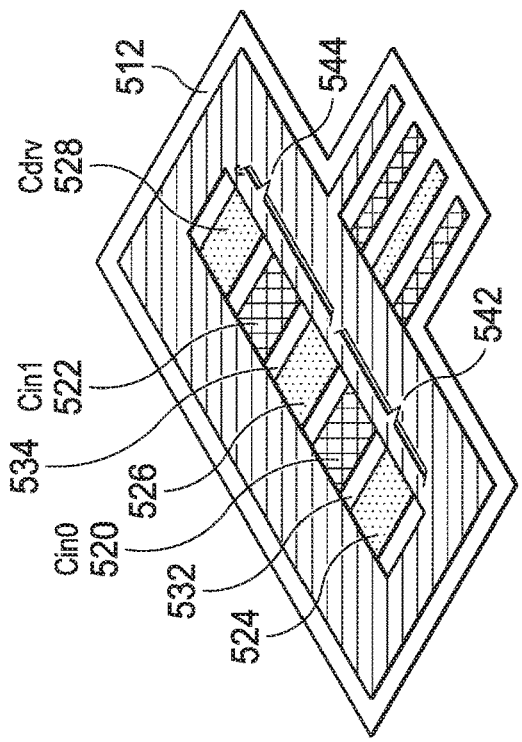
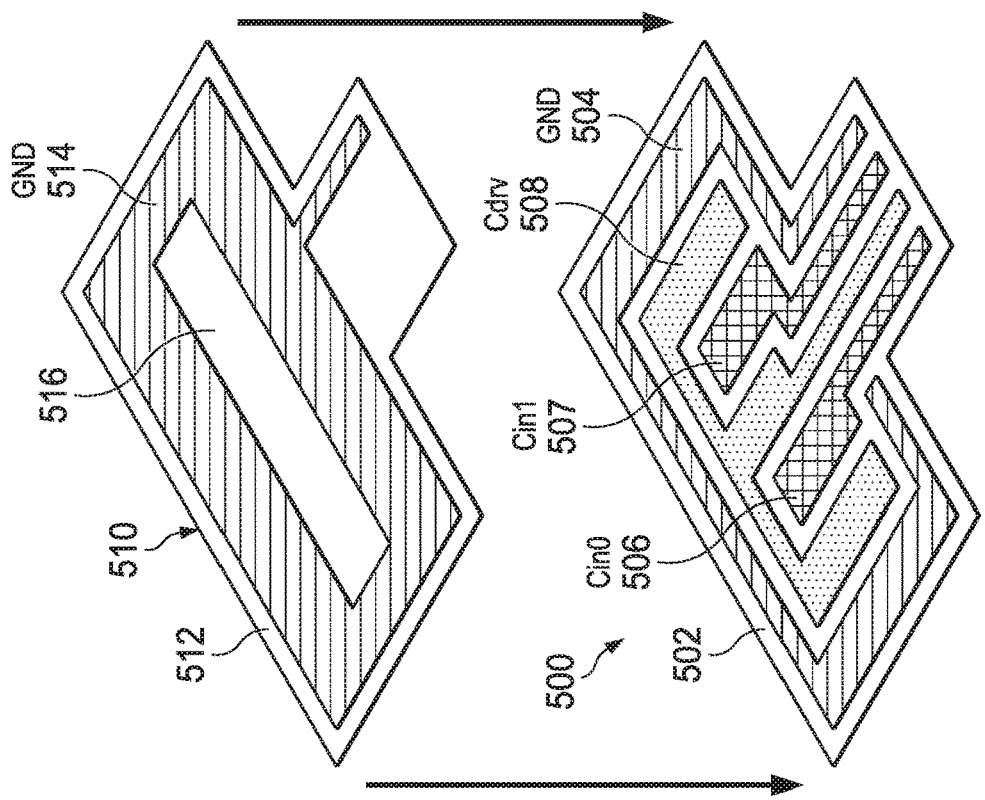
FIG. 5B
FIG. 5A

PATTERN LAYOUT OF TOUCH SENSOR

BACKGROUND

Embodiments of the present invention relate, in general, to electronics and, more particularly, to integrators and methods of forming semiconductor devices.

In the past, the semiconductor industry used various methods and sensors for detecting changes in physical attributes and generating a signal indicative of those changes. Sensors are useful in mechanical systems, chemical systems, and biological systems, among others. For example, in mechanical systems sensors are useful in providing output information based on velocity, position, movement, temperature, altitude, etc.; in chemical systems sensors are used to provide information about the chemical composition of their environment; and in biological systems sensors provide information about analytes present in a biological environment. In the electronics industry touch tensors have been used as input device for electronic devices such as mobile phones, portable audio devices, portable game consoles, televisions, and personal computers. An example of a prior electrostatic capacity type of touch sensor was disclosed in U.S. Pat. No. 8,618,818, titled "Electrostatic Capacity Type Touch Sensor" by Takayasu Otagaki et al. and issued on Dec. 31, 2013. A drawback with sensors is that different sensors may vary in their level of sensitivity.

Accordingly, it would be advantageous to have a sensor and method of sensing or detecting physical attributes or changes in the physical attributes. It would be of further advantage for the structure and method to be cost effective to implement.

BRIEF DESCRIPTION OF THE DRAWINGS

Embodiments of the present invention will be better understood from a reading of the following detailed description, taken in conjunction with the accompanying drawing figures, in which like reference characters designate like elements and in which:

FIGS. 5A and 5B illustrate an example of masking an electroconductive pattern according to at least one embodiment;

Figure 1:
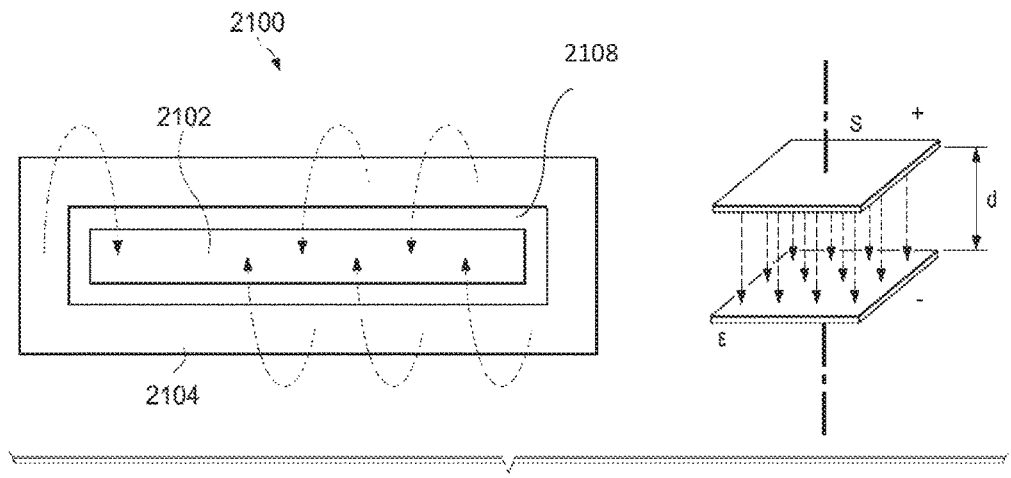
FIG. 1 illustrates a top view of an example of a sensing element.

For simplicity and clarity of illustration, elements in the figures are not necessarily to scale, and the same reference characters in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) are regarded as reasonable variances from the ideal goal of exactly as described.

DETAILED DESCRIPTION

In accordance with at least one embodiment, a touch sensor includes a first electroconductive pattern including at least two electrodes. The touch sensor further includes a second electroconductive pattern configured to mask a portion of the first electroconductive pattern when positioned over or under the first electroconductive pattern. The second electroconductive pattern masks the portion of the first electroconductive pattern such that an unmasked portion of the first electroconductive pattern includes unmasked portions of the at least two electrodes. The unmasked portions are of approximately equal length.

In accordance with at least another embodiment, a method of providing a touch sensor includes providing a first electroconductive pattern including at least two electrodes. The method further includes providing a second electroconductive pattern configured to mask a portion of the first electroconductive pattern when positioned over or under the first electroconductive pattern. The second electroconductive pattern masks the portion of the first electroconductive pattern such that an unmasked portion of the first electroconductive pattern includes unmasked portions of the at least two electrodes. The unmasked portions are of approximately equal length.

Each of the foregoing embodiments may be implemented in combination and/or may include one or more of the following features in any combination: (1) wherein: the at least two electrodes include a first electrode and a second electrode; an unmasked portion of the first electrode and a first unmasked portion of the second electrode are spaced apart by a first trace; the unmasked portion of the first electrode and a second unmasked portion of the second electrode are spaced apart by a second trace; and the first trace and the second trace are of approximately equal length; (2) a first lead-out electrode coupled to the first electrode; and a second lead-out electrode coupled to the second electrode; (3) a sensor that detects a capacitance formed by the first electrode and the second electrode; (4) wherein the second electroconductive pattern includes a ground electrode pattern for masking the portion of the first electroconductive pattern when the second electroconductive pattern is positioned over or under the first electroconductive pattern; (5) wherein the first electroconductive pattern and the second electroconductive pattern are disposed adjacent each other on a same planar surface of a sheet; (6) wherein the sheet includes an electroconductive film sheet or a flexible sensor sheet; (7) wherein: the sheet is foldable; and the first electroconductive pattern and the second electroconductive pattern are disposed adjacent each other on the same planar surface, such that folding the sheet causes the second electroconductive pattern to mask the portion of the first electroconductive pattern; (8) wherein: the sheet is rollable; and the first electroconductive pattern and the second electroconductive pattern are disposed adjacent each other on the same planar surface, such that rolling the sheet causes the second electroconductive pattern to mask the portion of the first electroconductive pattern; (9) wherein: the first electroconductive pattern is disposed on a first planar surface; and the second electroconductive pattern is disposed on a second planar surface different from the first planar surface; (10) wherein: the at least two electrodes include a first electrode and a second electrode; an unmasked portion of the first electrode and a first unmasked portion of the second electrode are spaced apart by a first trace; the unmasked portion of the first electrode and a second unmasked portion of the second electrode are spaced apart by a second trace; and the first trace and the second trace are of approximately equal length; (11) providing a first lead-out electrode coupled to the first electrode; and providing a second lead-out electrode coupled to the second electrode; (12) providing a sensor that detects a capacitance formed by the first electrode and the second electrode; (13) wherein the second electroconductive pattern including a ground electrode pattern for masking the portion of the first electroconductive pattern when the second electroconductive pattern is positioned over or under the first electroconductive pattern; (14) wherein the first electroconductive pattern and the second electroconductive pattern are disposed adjacent each other on a same planar surface of a sheet; (15) wherein the sheet includes an electroconductive film sheet or a flexible sensor sheet; (16) wherein: the sheet is foldable; the first electroconductive pattern and the second electroconductive pattern are disposed adjacent each other on the same planar surface; and the method further includes folding the sheet to cause the second electroconductive pattern to mask the portion of the first electroconductive pattern; (17) wherein: the sheet is rollable; the first electroconductive pattern and the second electroconductive pattern are disposed adjacent each other on the same planar surface; and the method further includes rolling the sheet to cause the second electroconductive pattern to mask the portion of the first electroconductive pattern; (18) wherein: the first electroconductive pattern is disposed on a first planar surface; and the second electroconductive pattern is disposed on a second planar surface different from the first planar surface.

FIG. 1 illustrates a top view of an example of a sensing element (or sensor) 2100. The sensing element 2100 includes an input pad 2102 and a drive pad 2104. The input pad 2102 and the drive pad 2104 are spaced apart from each other by a clearance 2108. For example, the input pad 2102 and the drive pad 2104 may be spaced apart from each other by a dielectric material or air in the clearance 2108.

The drive pad 2104 and input pad 2102 form a capacitor. When a voltage is applied between the drive pad 2104 and the input pad 2102, the capacitor becomes charged. One pad (e.g., the input pad 2102) acquires a negative charge, and the other pad (e.g., the drive pad 2104) acquires an equal amount of positive charge. Accordingly, an electric line of force (e.g., an electric field) is present between the two pads.

With continued reference to FIG. 1, the pads 2102, 2104 may be modeled as two plates. The capacitance C of the capacitor may be equal to $\varepsilon S/d$, where $\varepsilon$ denotes the permittivity in the spacing or separation (see, e.g., clearance 2108) between the two plates, S denotes the surface area of each plate, and d denotes the distance between the plates.

Figure 2A:
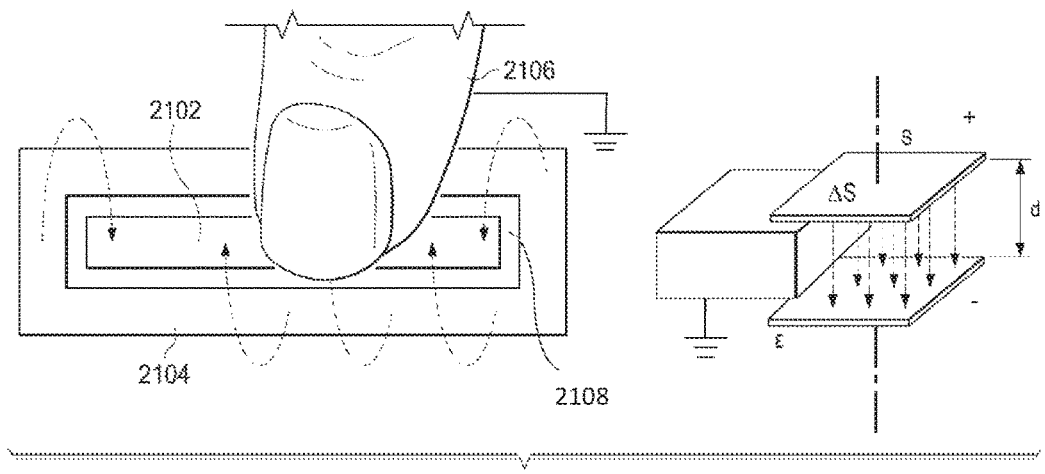
FIG. 2A illustrates a top view of a substance (e.g., conductive element coupled to ground) placed in the separation between an input pad and a drive pad.

FIG. 2A illustrates a top view of a substance (e.g., conductive element coupled to ground) placed in the separation between an input pad 2102 and a drive pad 2104. When the conductive element coupled to ground (e.g., finger 2106) is placed in this separation, electric charge flows less readily than in air. As the conductive element coupled to ground fills the separation, the capacitance C of the capacitor is decreased by an amount $\Delta C$. Therefore, the effective capacitance of the capacitor becomes $C-\Delta C$.

Figure 2B:
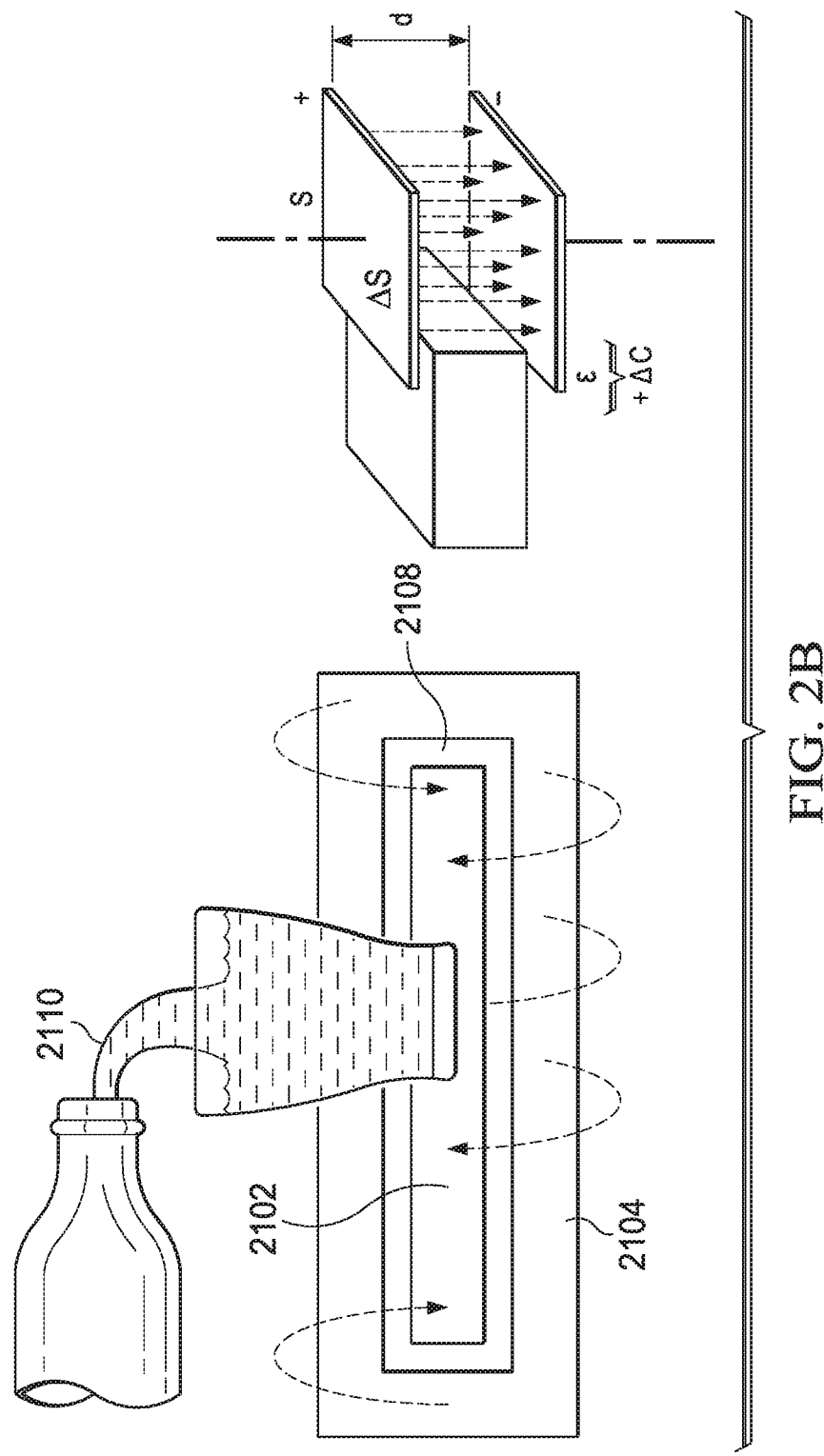
FIG. 2B illustrates a top view of a substance (e.g., dielectric) placed in the separation between an input pad and a drive pad.

As another example, FIG. 2B illustrates a top view of a substance (e.g., dielectric) placed in the separation between an input 2102 pad and a drive pad 2104. While air has a permittivity of around 1, water 2110 has a permittivity of around 80. Therefore, when a dielectric such as water 2110 (rather than air) fills the separation between the input pad 2102 and the drive pad 2104, the value of C, as calculated using the equation $C=\varepsilon S/d$, increases.

Figure 3A:
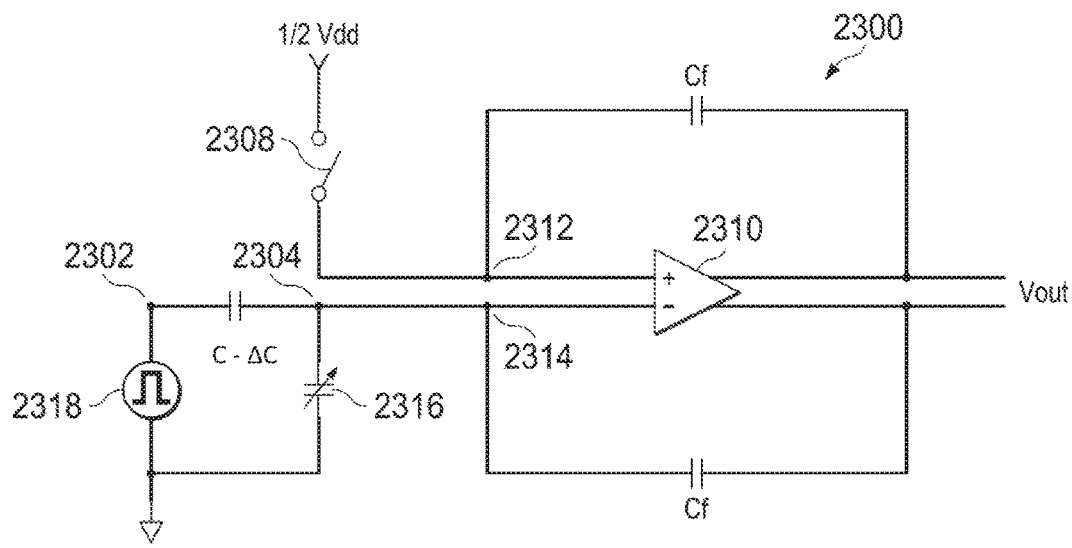
FIGS. 3A and 3B illustrate diagrams of an example circuit that represents a device.
Figure 3B:
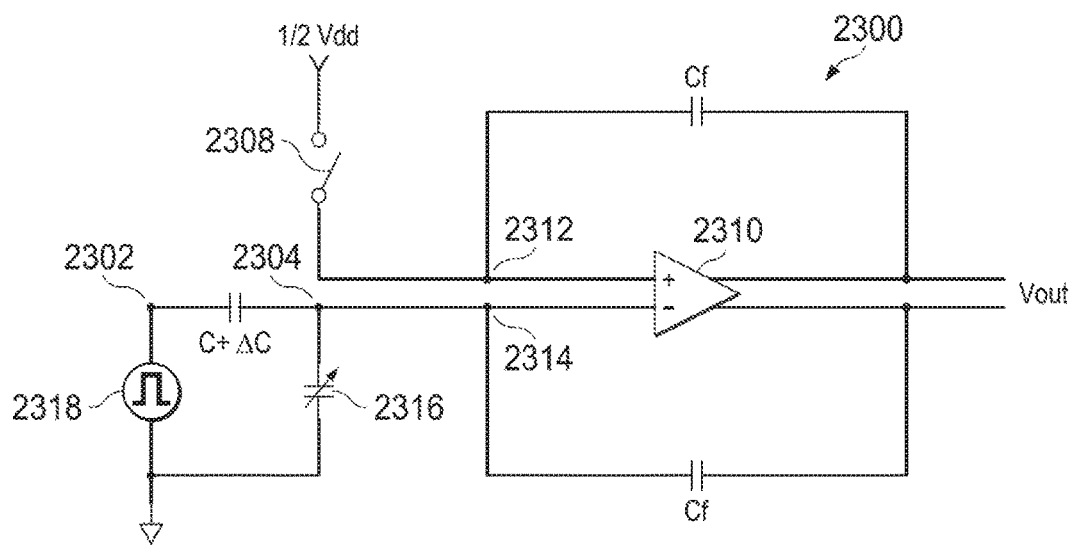

FIGS. 3A and 3B illustrate diagrams of an example circuit that represents a device 2300. The device 2300 includes the sensor 2100. The device 2300 may be an integrated circuit (IC). Node 2302 represents the drive pad 2104 of the sensor 2100. Node 2304 represents the input pad 2102 of the sensor 2100. The device 2300 also includes a switch 2308 and a differential amplifier 2310. The differential amplifier 2310 has input terminals 2312 and 2314. The device 2300 also includes a corrective capacitor (variable capacitor) 2316. In operation, the capacitance of the corrective capacitor 2316 adjusts according to the capacitance of the sensor 2100. For example, the capacitance of the corrective capacitor 2316 adjusts to be equal to the capacitance of the sensor 2100.

The sensor 2100 may be calibrated at each of one or more instances. During each calibration, the output of the differential amplifier 2310 is monitored. As will be described in more detail below, the capacitance of the corrective capacitor 2316 is noted when the output of the differential amplifier 2310 becomes logic low (e.g., 0V).

Calibration at the device 2300 will now be described with reference with a situation in which there is a lack of material adjacent to the separation between the input pad 2102 and the drive pad 2104 (e.g., the finger 2106 or the water 2110 is not located at the clearance 2108).

A pulse 2318 of amplitude Vdd is applied between the drive pad 2104 and a return for the pulse (e.g., GND). The capacitor formed by the drive pad 2104 and the input pad 2102 has a capacitance of C. During calibration, the capacitance of the corrective capacitor 2316 adjusts to be equal to the capacitance of the sensor 2100. When the two capacitance values are equal to each other, the voltage drop between the drive pad 2104 and the input pad 2102 becomes equal to the voltage drop across the corrective capacitor 2316. For example, when Vdd is applied between the drive pad 2104 and the return, both the voltage drop between the drive pad 2104 and the input pad 2102 and the voltage drop across the corrective capacitor 2316 become equal to Vdd/2.

In the above situation, the input at the input terminal 2314 of the differential amplifier 2310 becomes equal to Vdd/2. When the switch 2308 is closed, the input at the input terminal 2312 of the differential amplifier 2310 is also equal to Vdd/2. Accordingly, the inputs to the differential amplifier 2310 are equal to each other. Therefore, the output of the differential amplifier 2310 becomes logic low. This indicates that the capacitance of the corrective capacitor 2316 has adjusted to be equal to the capacitance of the sensor 2100. Accordingly, the capacitance of the corrective capacitor 2316 (C) is noted.

Calibration at the device 2300 will now be described with reference with a situation in which there is a presence of material adjacent to the separation between the input pad 2102 and the drive pad 2104 (e.g., the finger 2106 or the water 2110 is located at the clearance 2108).

With reference to FIG. 3A, a pulse of amplitude Vdd is applied between the drive pad 2104 and a return for the pulse (e.g., GND). The capacitor formed by the drive pad 2104 and the input pad 2102 has a capacitance of C−ΔC. The decrease ΔC is due to the decrease of the electric field because the finger 2106 is coupled to ground. During calibration, the capacitance of the corrective capacitor 2316 adjusts to be equal to the capacitance of the sensor 2100. When the two capacitance values are equal to each other, the voltage drop between the drive pad 2104 and the input pad 2102 becomes equal to the voltage drop across the corrective capacitor 2316. For example, when Vdd is applied between the drive pad 2104 and the return, both the voltage drop between the drive pad 2104 and the input pad 2102 and the voltage drop across the corrective capacitor 2316 become equal to Vdd/2.

In the situation of FIG. 3A, the input at the input terminal 2314 of the differential amplifier 2310 becomes equal to Vdd/2. When the switch 2308 is closed, the input at the input terminal 2312 of the differential amplifier 2310 is also equal to Vdd/2. Accordingly, the inputs to the differential amplifier 2310 are equal to each other. Therefore, the output of the differential amplifier 2310 is logic low. This indicates that the capacitance of the corrective capacitor 2316 has adjusted to be equal to the capacitance of the sensor 2100. Accordingly, the capacitance of the corrective capacitor 2316 (C−ΔC) is noted.

With reference to FIG. 3B, a pulse of amplitude Vdd is applied between the drive pad 2104 and a return for the pulse. The capacitor formed by the drive pad 2104 and the input pad 2102 has a capacitance of C+ΔC. The increase ΔC is due to the greater permittivity of the fluid (e.g., water 2110) relative to that of air. During calibration, the capacitance of the corrective capacitor 2316 adjusts to be equal to the capacitance of the sensor 2100. When the two capacitance values are equal to each other, the voltage drop between the drive pad 2104 and the input pad 2102 becomes equal to the voltage drop across the corrective capacitor 2316. For example, when Vdd is applied between the drive pad 2104 and the return, both the voltage drop between the drive pad 2104 and the input pad 2102 and the voltage drop across the corrective capacitor 2316 become equal to Vdd/2.

In the situation of FIG. 3B, the input at the input terminal 2314 of the differential amplifier 2310 becomes equal to Vdd/2. When the switch 2308 is closed, the input at the input terminal 2312 of the differential amplifier 2310 is also equal to Vdd/2. Accordingly, the inputs to the differential amplifier 2310 are equal to each other. Therefore, the output of the differential amplifier 2310 is logic low. This indicates that the capacitance of the corrective capacitor 2316 has adjusted to be equal to the capacitance of the sensor 2100. Accordingly, the capacitance of the corrective capacitor 2316 (C+ΔC) is noted.

An initial measurement at the device 2300 may be performed at a particular time (e.g., when the device is placed in a container for containing liquid, and the container is empty). The capacitance of the corrective capacitor 2316 (e.g., C) is noted at this time. This value may be stored as a reference value.

During each of subsequent calibrations, the capacitance of the corrective capacitor 2316 is noted and is compared against the reference value. If there is little or no difference between the capacitance of the corrective capacitor 2316 and the reference value, then it may be determined that there is a lack of fluid adjacent to the separation between the input pad 2102 and the drive pad 2104 (e.g., the sensor 2100). Accordingly, it may be determined that the fluid surface is not at the level of the sensor 2100. If there is a larger difference between the capacitance of the corrective capacitor 2316 and the reference value, then it may be determined that there is a presence of fluid adjacent to the separation between the input pad 2102 and the drive pad 2104 (e.g., the sensor 2100). Accordingly, it may be determined that the fluid surface is at the level of the sensor 2100.

Aspects of the present disclosure are directed to touch sensors such as sensing element 2100. For example, particular aspects are related to electroconductive patterns that form the touch sensors. The patterns are configured such that sensors having a same (or similar) level of sensitivity are formed. The sensitivity level relates to the representation of the change in capacitance as the representation is converted from an analog value into a digital value (e.g., digital output). According to particular embodiments, two or more of such patterns are located on a same surface (e.g., a same surface of a one-layer electroconductive film sheet).

According to various embodiments, two electroconductive patterns are employed. The patterns may be located on different surfaces (e.g., different planar surfaces) or a same surface (e.g., a same planar surface). For example, the patterns may be located on different substrates. As another example, the patterns may be located on different surfaces of a two-layer electroconductive film sheet. On such a film sheet, a first pattern is located on a first surface of the two-layer electroconductive film sheet (e.g., a top surface), and a second pattern is located on a second surface of the two-layer electroconductive film sheet (e.g., a bottom surface). As another example, the patterns are located (e.g., adjacent to each other) on a same surface of a one-layer electroconductive film sheet. According to this example, two or more patterns are located on only one surface of the sheet (e.g., either the top surface or the bottom surface). No patterns are located on the other surface of the sheet.

In at least some situations, using single-layer film sheets is preferable two using two-layer film sheets. This is because a two-layer sheet is generally more expensive than a one-layer sheet. For example, the two-layer sheet may be around 1.5 times as expensive as the one-layer sheet.

As noted, particular aspects of this disclosure are related to electroconductive patterns that form touch sensors. In more detail, the electroconductive patterns form electrodes (see, e.g., input pad 2102 and drive pad 2104 of FIG. 1) that, in turn, form the touch sensors. Variations in the size of the electrodes that are formed by an electroconductive pattern affect the sensitivity of the sensors formed by the electrodes. For example, a particular electroconductive pattern may form a first electrode. The electroconductive pattern may also form a second electrode that is significantly larger than a second electrode. Due to the size variation, a first sensor that is formed by the first electrode may have a sensitivity (e.g., a sensitivity to touch) that is significantly different from a sensitivity of a second sensor that is formed by the second electrode. The difference in the sensitivity may also be caused by variations in the trace length. The trace is a clearance that is located between electrodes of a sensor (see, e.g., clearance 2108 between input pad 2102 and drive pad 2104 of FIG. 1). In some situations, the electroconductive pattern also forms a return electrode (e.g., ground electrode) for reducing or controlling noise. The presence of such an electrode may increase the amount of parasitic capacitance and may, therefore, affect sensor sensitivity as well.

Figure 4:
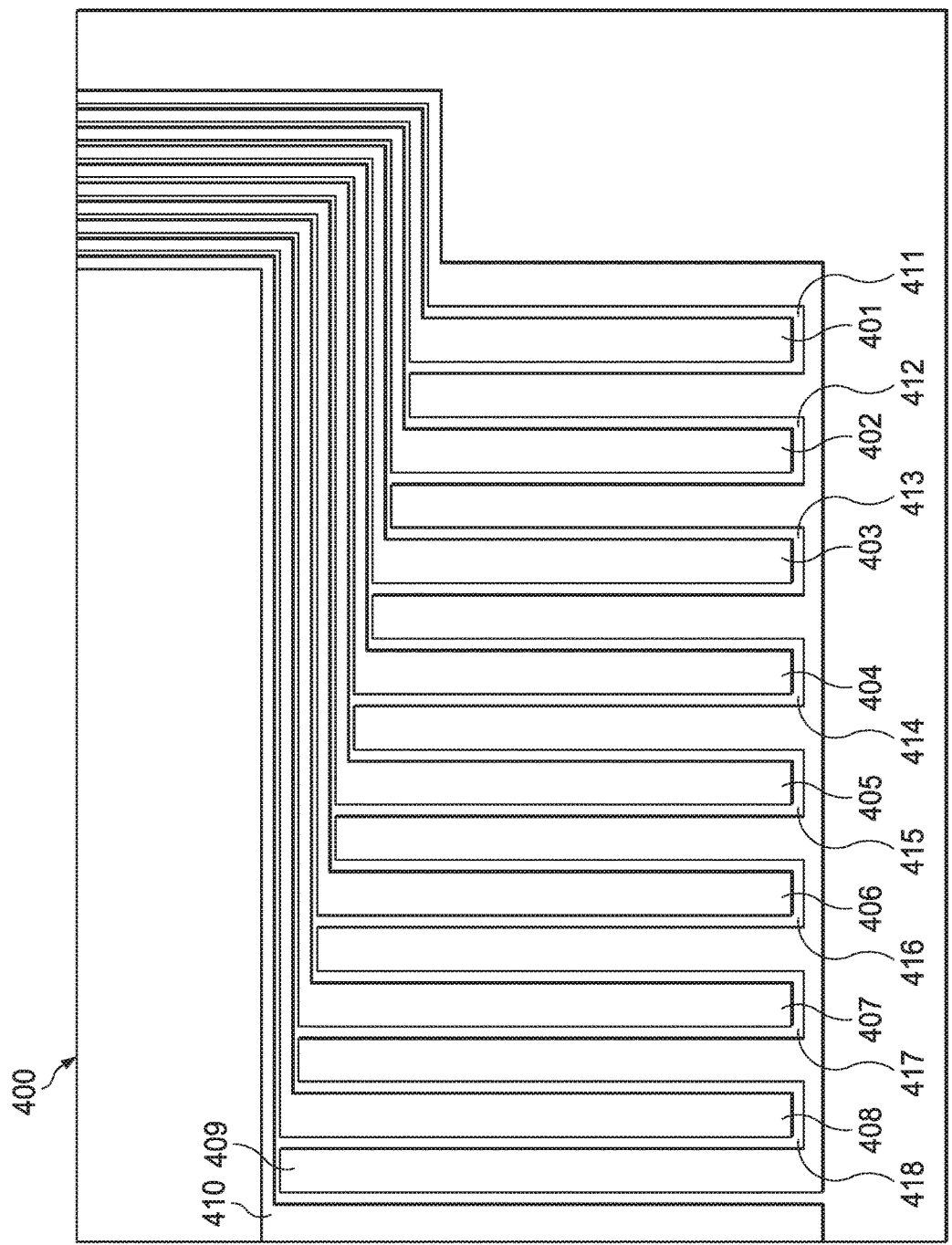
FIG. 4 illustrates an example of a patterned electroconductive film sheet.

Such attributes will be described, by way of example, with reference to FIG. 4. FIG. 4 illustrates an example of a patterned electroconductive film sheet 400. The pattern includes input electrodes 401, 402, 403, 404, 405, 406, 407 and 408. The pattern also includes drive electrode 409 and ground electrode 410.

Trace 411 is located between input electrode 401 and drive electrode 409. Trace 412 is located between input electrode 402 and drive electrode 409. Trace 413 is located between input electrode 403 and drive electrode 409. Trace 414 is located between input electrode 404 and drive electrode 409. Trace 415 is located between input electrode 405 and drive electrode 409. Trace 416 is located between input electrode 406 and drive electrode 409. Trace 417 is located between input electrode 407 and drive electrode 409. Trace 418 is located between input electrode 408 and drive electrode 409.

As illustrated in FIG. 4, the size (e.g., length) of the input electrodes 401, 402, 403, 404, 405, 406, 407 and 408 varies considerably. In more detail, input electrode 401 is smaller than input electrode 402, which, in turn, is smaller than input electrode 403, which, in turn, is smaller than input electrode 404, etc. Input electrode 401 is considerably smaller than input electrode 408. Variations in the size of the input electrodes 401, 402, 403, 404, 405, 406, 407 and 408 affect the sensitivity of sensors that are formed by these electrodes. For example, a sensor (see, e.g., sensor 2100) that is formed by the input electrode 401 has a sensitivity (e.g., a sensitivity to touch) that is significantly different from a sensitivity of a sensor that is formed by the input electrode 408.

In addition, the length of the traces 411, 412, 413, 414, 415, 416, 417 and 418 also varies. In more detail, trace 411 is shorter than trace 412, which, in turn, is shorter than trace 413, which, in turn, is shorter than trace 414, etc. Trace 411 is considerably shorter than trace 418. Variations in the length of the traces 411, 412, 413, 414, 415, 416, 417 and 418 affect the sensitivity of sensors that are formed by the input electrodes 401, 402, 403, 404, 405, 406, 407 and 408. In general, a longer trace contributes to an increase in sensitivity level. By way of simplified illustration, a sensor that is formed by the input electrode 401 may have a sensitivity value of 100, while a sensor that is formed by the input electrode 408 may have a sensitivity value of 120. The sensitivity value may be expressed in units of least significant bit per femto Farad (LSB/pF).

According to various embodiments, variations in the size of input electrodes (e.g., input electrodes 401, 402, 403, 404, 405, 406, 407 and 408) and/or variations in the lengths of traces (e.g., traces 411, 412, 413, 414, 415, 416, 417 and 418) are reduced. For example, according to particular embodiments, the sizes of the input electrodes are effectively made to be approximately equal, and/or the lengths of the traces are made to be approximately equal. Accordingly, variations in the sensitivity of capacitive sensors formed by the input electrodes are reduced. According to particular embodiments, sensitivity variations are reduced by using a second electroconductive pattern to mask a portion of a first electroconductive pattern.

FIGS. 5A and 5B illustrate an example of masking an electroconductive pattern according to at least one embodiment. With reference to FIG. 5A, an electroconductive pattern 502 and an electroconductive pattern 512 are provided. The electroconductive pattern 502 is provided, for example, on a surface (e.g., planar surface) of a substrate 500 or a printed circuit board (PCB). Similarly, the electroconductive pattern 512 is provided, for example, on a surface of a substrate 510 or a PCB. The electroconductive patterns 502 and 512 may be formed by depositing conductive materials on the respective surfaces and/or by using any other known techniques.

The electroconductive pattern 502 forms various electrodes, including input electrodes Cin0 and Cin1, drive electrode Cdrv, and ground electrode 504. Input electrode Cin0 is smaller (e.g., shorter in length) than input electrode Cin1. Input electrode Cin0 and input electrode Cin1 are coupled, respectively, to lead-out electrodes 506 and 507. Drive electrode Cdrv is coupled to lead-out electrode 508.

The electroconductive pattern 512 forms ground electrode 514. The electroconductive pattern 512 is configured to mask a portion of the electroconductive pattern 502 when positioned over or under the electroconductive pattern 502. For example, the electroconductive pattern 512 has a window 516. Unlike the ground electrode 514, the window 516 lacks any conductive material(s). The window 516 leaves portions of electrodes in the electroconductive pattern 502 exposed (or unmasked) when the electroconductive pattern 512 is positioned over or under the electroconductive pattern 502.

As illustrated in FIG. 5B, when the electroconductive pattern 502 is masked by the electroconductive pattern 512, a portion of the electroconductive pattern 502 is left unmasked (or exposed). For example, portion 520 of input electrode Cin0, portion 522 of input electrode Cin1, and portions 524, 526, and 528 of the drive electrode Cdrv are left unmasked. Portion 520 of input electrode Cin0 and portion 524 of the drive electrode Cdrv are separated by trace 532. Portion 522 of input electrode Cin1 and portion 526 of the drive electrode Cdrv are separated by trace 534.

By masking the electroconductive pattern 502, the portions 520 and 522 are configured to be approximately equal in length. Similarly, the portions 524, 526 and 528 are approximately equal in length. Further, the lengths of the portions 520 and 522 are approximately equal to the lengths of the portions 524, 526, and 528. In addition, the traces 532 and 534 are approximately equal in length.

The (approximate) equalization of the lengths of the portions 520 and 522 reduces variations between the sensitivities of respective sensors formed by the input electrodes Cin0 and Cin1. For example, Cin0 may form a sensor 542, and Cin1 may form a sensor 544. Because the portions 520 and 522 are formed to be approximately equal in length, the sensitivity of sensor 542 and the sensitivity of sensor 544 become similar to (or closer to) each other. Also because the traces 532 and 534 are approximately equal in length, the sensitivity of sensor 542 and the sensitivity of sensor 544 become similar to each other.

By way of explanation, an object (e.g., finger 2106) that is positioned proximate to sensor 542 causes the magnitude of electric fields between portion 520 of input electrode Cin0 and portion 524 of drive electrode Cdrv (and between portion 520 of input electrode Cin0 and portion 526 of drive electrode Cdrv to change. However, due to the masking of the electroconductive pattern 502 by the electroconductive pattern 512, the proximity of the object does not result in changes in the electric field between masked portions of the input electrode Cin0 and the drive electrode Cdrv.

Similarly, an object (e.g., finger 2106) that is positioned proximate to sensor 544 causes the magnitude of electric fields between portion 522 of input electrode Cin1 and portion 526 of drive electrode Cdrv (and between portion 522 of input electrode Cin1 and portion 528 of drive electrode Cdrv) to change. However, due to the masking of the electroconductive pattern 502 by the electroconductive pattern 504, the proximity of the object does not result in changes in the electric field between masked portions of the input electrode Cin1 and the drive electrode Cdrv.

As noted earlier, Cin0 is shorter in length than Cin1. However, because the portions 520 and 522 are configured to be approximately equal in length (and/or the traces 532 and 534 are configured to be approximately equal in length), the sensitivity of sensor 542 is similar in level to the sensitivity of sensor 544.

It is understood that the electroconductive pattern 512 may be replaced with a drive electrode ground electrode 514 of. Also, it is understood the number of input electrodes in the electroconductive pattern 502 may be increased. Further, it is understood that electroconductive patterns of other shapes and sizes may be used.

Figure 6A:
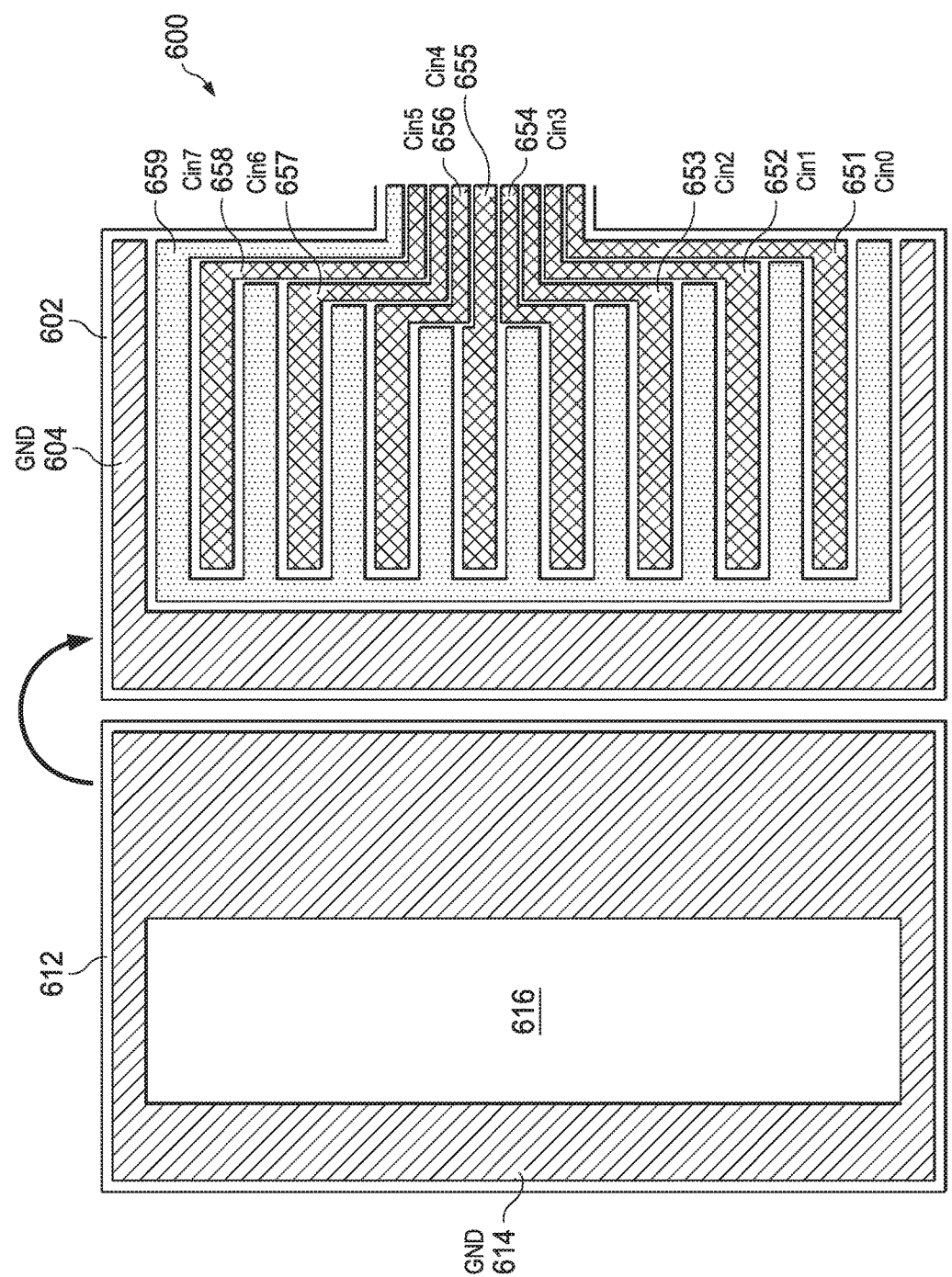
FIGS. 6A and 6B illustrate an example of masking an electroconductive pattern according to at least one embodiment.
Figure 6B:
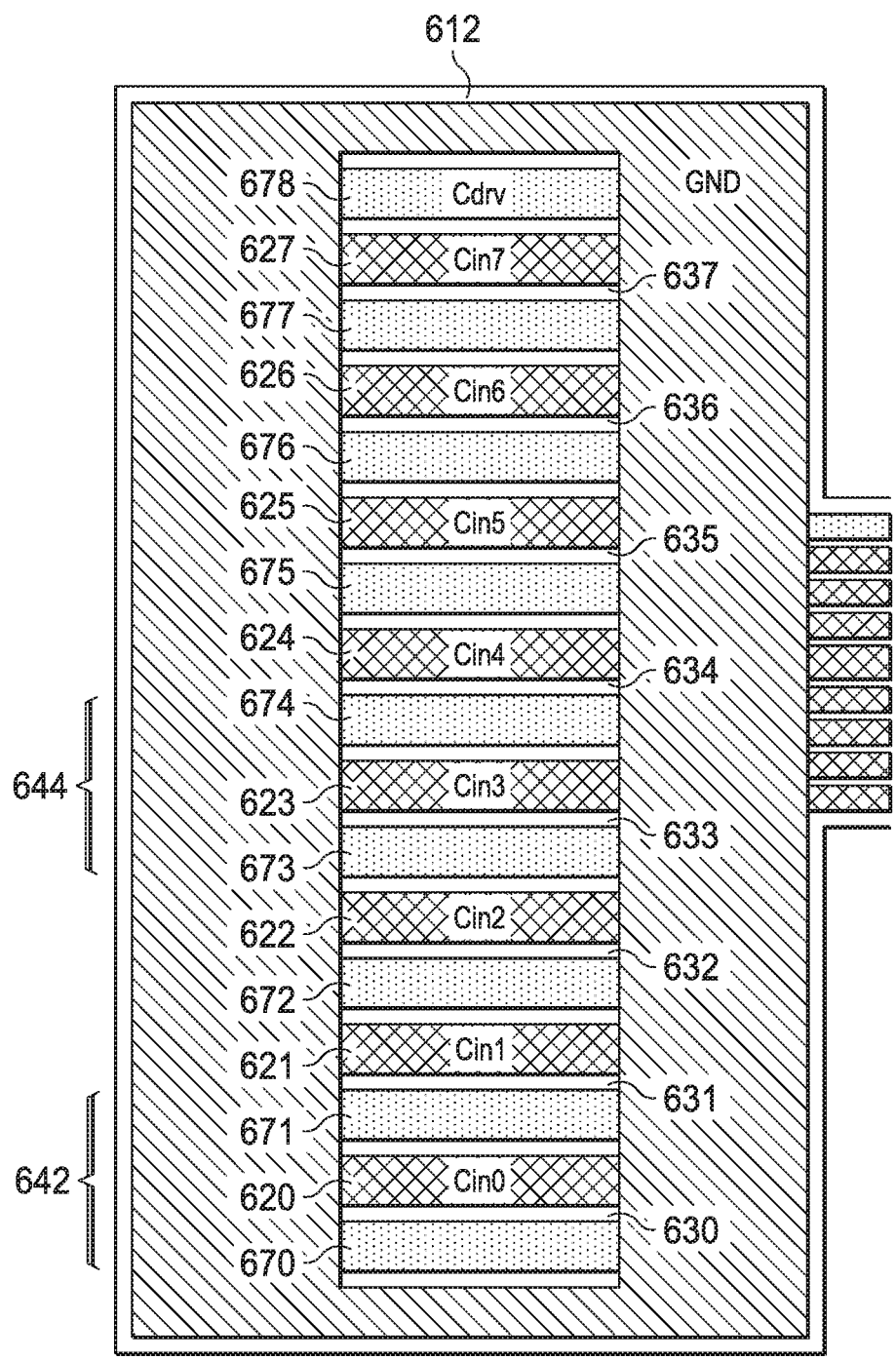

FIGS. 6A and 6B illustrate an example of masking an electroconductive pattern according to at least one embodiment. With reference to FIG. 6A, an electroconductive pattern 602 and an electroconductive pattern 612 are provided. The electroconductive pattern 602 may be provided, for example, on a surface (e.g., planar surface) of a substrate or a printed circuit board (PCB). Similarly, the electroconductive pattern 612 may be provided, for example, on a surface of a substrate or a PCB. The electroconductive patterns 602 and 612 may be formed by depositing conductive materials on the respective surfaces and/or by using any other known techniques.

Alternatively, the electroconductive pattern 602 is provided on a surface (e.g., top planar surface) of a film sheet 600. The electroconductive pattern 612 is provided on another surface (e.g., bottom planar surface) of the film sheet 600. The electroconductive patterns 602 and 612 may be formed by etching the film sheet 600 and/or by using any other known techniques.

The electroconductive pattern 602 forms various electrodes, including input electrodes Cin0, Cin1, Cin2, Cin3, Cin4, Cin5, Cin6 and Cin7, drive electrode Cdrv, and ground electrode 604. Input electrode Cin3 is smaller (e.g., shorter in length) than input electrode Cin2, which, in turn, is smaller than Cin1, which, in turn, is smaller than Cin0. Similarly, input electrode Cin4 is smaller (e.g., shorter in length) than input electrode Cin5, which, in turn, is smaller than Cin6, which, in turn, is smaller than Cin7. Input electrodes Cin0, Cin1, Cin2, Cin3, Cin4, Cin5, Cin6 and Cin7 are coupled, respectively, to lead-out electrodes 651, 652, 653, 654, 655, 656, 657 and 658. Drive electrode Cdrv is coupled to lead-out electrode 659.

The electroconductive pattern 612 forms ground electrode 614. The electroconductive pattern 612 is configured to mask a portion of the electroconductive pattern 602 (e.g., due to the overlapping placement of the patterns 602 and 612 relative to each other). For example, the electroconductive pattern 612 has a window 616. The window 616 leaves portions of electrodes in the electroconductive pattern 602 exposed (or unmasked).

As illustrated in FIG. 6B, when the electroconductive pattern 602 is masked by the electroconductive pattern 612, a portion of the electroconductive pattern 602 is left unmasked. For example, portion 620 of input electrode Cin0, portion 621 of input electrode Cin1, portion 622 of input electrode Cin2, portion 623 of input electrode Cin3, portion 624 of input electrode Cin4, portion 625 of input electrode Cin5, portion 626 of input electrode Cin6, portion 627 of input electrode Cin7, and portions 670, 671, 672, 673, 674, 675, 676, 677 and 678 of the drive electrode Cdrv are left unmasked.

Portion 620 of input electrode Cin0 and portion 670 of the drive electrode Cdrv are separated by trace 630. Portion 621 of input electrode Cin1 and portion 671 of the drive electrode Cdrv are separated by trace 631. Portion 622 of input electrode Cin2 and portion 672 of the drive electrode Cdrv are separated by trace 632. Portion 623 of input electrode Cin3 and portion 673 of the drive electrode Cdrv are separated by trace 633. Portion 624 of input electrode Cin4 and portion 674 of the drive electrode Cdrv are separated by trace 634. Portion 625 of input electrode Cin5 and portion 675 of the drive electrode Cdrv are separated by trace 635. Portion 626 of input electrode Cin6 and portion 676 of the drive electrode Cdrv are separated by trace 636. Portion 627 of input electrode Cin7 and portion 677 of the drive electrode Cdrv are separated by trace 637.

By masking the electroconductive pattern 602, the portions 620, 621, 622, 623, 624, 625, 626 and 627 of the input electrodes are configured to be approximately equal in length. Similarly, the portions 670, 671, 672, 673, 674, 675, 676, 677 and 678 of the drive electrode Cdrv are approximately equal in length. Further, the lengths of the noted portions of the input electrodes (portions 620, 621, 622, 623, 624, 625, 626 and 627) are approximately equal to the lengths of the noted portions of the drive electrode (portions 670, 671, 672, 673, 674, 675, 676, 677 and 678). Further, the traces 630, 631, 632, 633, 634, 635, 636 and 637 are approximately equal in length.

The (approximate) equalization of the lengths of the portions 620, 621, 622, 623, 624, 625, 626 and 627 reduces variations between the sensitivities of respective sensors formed by the input electrodes Cin0, Cin1, Cin2, Cin3, Cin4, Cin5, Cin6 and Cin7. For example, Cin0 may form a sensor 642, and Cin3 may form a sensor 644. Because the portions 620 and 623 are formed to be approximately equal in length, the sensitivity of sensor 642 and the sensitivity of sensor 644 become similar to (or closer to) each other. Also because the traces 630 and 633 are approximately equal in length, the sensitivity of sensor 642 and the sensitivity of sensor 644 become similar to each other.

As noted earlier, Cin3 is shorter in length than Cin0. However, because the portions 620 and 623 are configured to be approximately equal in length (and/or the traces 630 and 633 are configured to be approximately equal in length), the sensitivity of sensor 642 is similar in level to the sensitivity of sensor 644.

In embodiments that have been described by way of example with reference to FIGS. 5A, 5B, 6A and 6B, different electroconductive patterns are disposed on different planar surfaces. According to other embodiments, different electroconductive patterns are disposed on a same planar surface. For example, a first electroconductive pattern and a second electroconductive pattern are provided adjacent each other on a same planar surface. For example, both electroconductive patterns may be provided on a same surface of an electroconductive film sheet or a same surface of a flexible sensor sheet.

Figure 7:
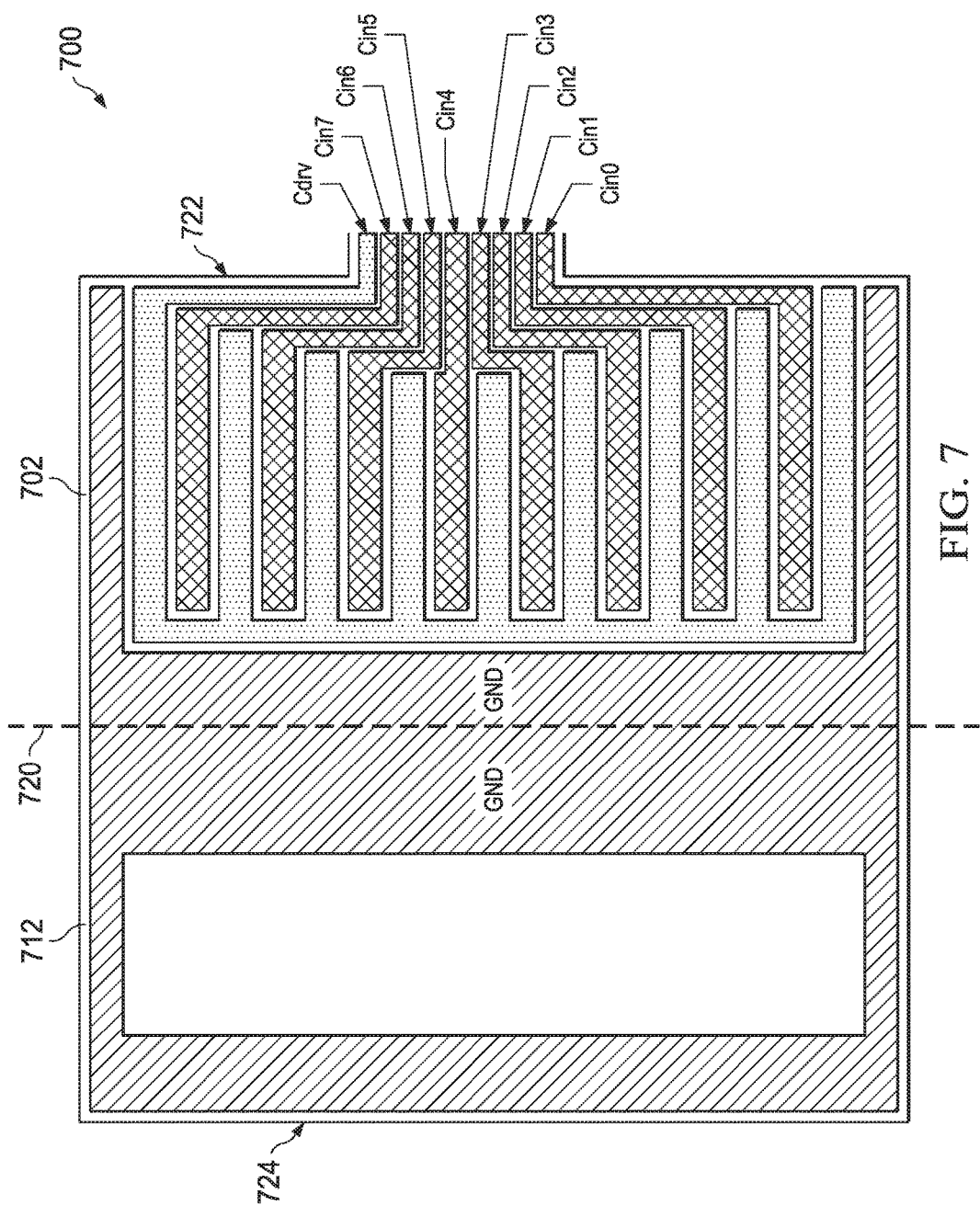
FIG. 7 illustrates an example of masking an electroconductive pattern according to at least one embodiment.

FIG. 7 illustrates an example of masking an electroconductive pattern according to at least one embodiment. With reference to FIG. 7, an electroconductive pattern 702 and an electroconductive pattern 712 are provided. The electroconductive pattern 702 is provided, for example, on a surface (e.g., planar surface) of an electroconductive film sheet (or a flexible sensor sheet) 700. The electroconductive pattern 712 is provided on the same surface of the sheet 700. For example, as illustrated in FIG. 7, the electroconductive patterns 702 and 712 are provided adjacent each other on the sheet 700. The electroconductive patterns 702 and 712 may be formed by etching the film sheet 700 and/or by using any other known techniques.

The electroconductive patterns 702 and 712 are similar, respectively, to the electroconductive patterns 602 and 612 of FIG. 6A. For purposes of brevity, the electroconductive patterns 702 and 712 will not be described in further detail below.

The sheet 700 is foldable. Folding the sheet 700 at the dotted line 720 causes the conductive pattern 712 to overlie the electroconductive pattern 702. For example, edge 724 of the sheet may be brought closer to the reader and, then, towards edge 722. Accordingly, the electroconductive pattern 712 can mask a portion of the electroconductive pattern 702.

The unmasked portion of the electroconductive pattern 702 is similar to the unmasked portion of the electroconductive pattern 602 that was described earlier with reference to FIG. 6B. Further, the sensors that are formed by unmasked portions of the electroconductive pattern 702 are similar to the sensors (e.g., sensors 642, 644) also described earlier with reference to FIG. 6B. For purposes of brevity, the unmasked portion of the electroconductive pattern 702 and sensitivity characteristics of sensors formed therefrom will not be described in further detail below.

Figure 8A:
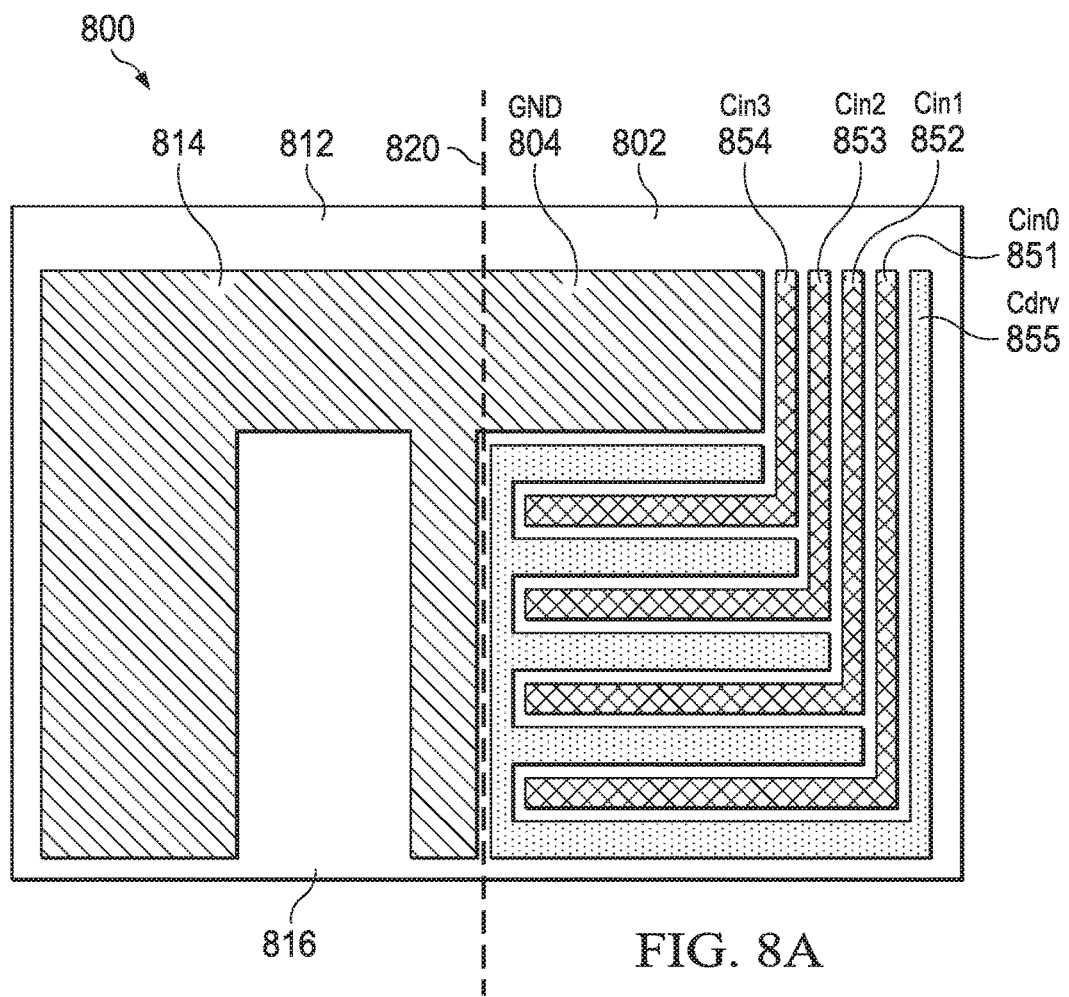
FIGS. 8A and 8B illustrate an example of masking an electroconductive pattern according to at least one embodiment.
Figure 8B:
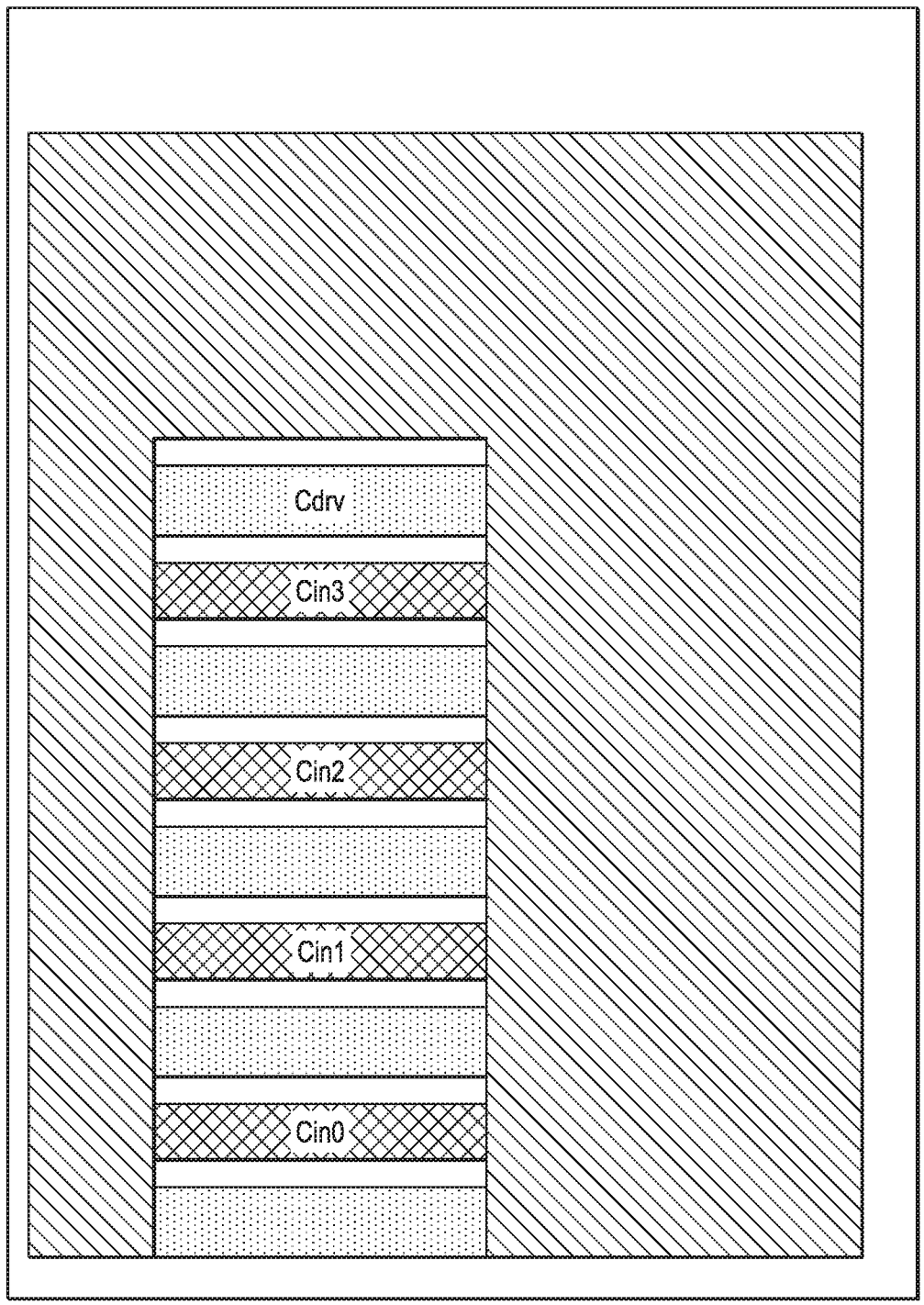

FIGS. 8A and 8B illustrate an example of masking an electroconductive pattern according to at least one embodiment. With reference to FIG. 8A, an electroconductive pattern 802 and an electroconductive pattern 812 are provided. The electroconductive pattern 802 is provided, for example, on a surface (e.g., planar surface) of an electroconductive film sheet (or a flexible sensor sheet) 800. The electroconductive pattern 812 is provided on the same surface of the sheet 800. For example, as illustrated in FIG. 8A, the electroconductive patterns 802 and 812 are provided adjacent each other on the sheet 800. The electroconductive patterns 802 and 812 may be formed by etching the film sheet 800 and/or by using any other known techniques.

The electroconductive pattern 802 forms various electrodes, including input electrodes Cin0, Cin1, Cin2 and Cin3, drive electrode Cdrv, and ground electrode 804. Input electrode Cin3 is smaller (e.g., shorter in length) than input electrode Cin2, which, in turn, is smaller than Cin1, which, in turn, is smaller than Cin0. Input electrodes Cin0, Cin1, Cin2 and Cin3 are coupled, respectively, to lead-out electrodes 851, 852, 853 and 854. Drive electrode Cdrv is coupled to lead-out electrode 855.

The electroconductive pattern 812 forms ground electrode 814 and has a "door" 816. The sheet 800 is foldable. The electroconductive pattern 812 is configured to mask a portion of the electroconductive pattern 802 when the sheet 800 is folded at the dotted line 820 (see, e.g., FIG. 8B). The door 816 leaves portions of electrodes in the electroconductive pattern 802 unmasked.

The unmasked portion of the electroconductive pattern 802 is similar to the unmasked portion of the electroconductive pattern 602 that was described earlier with reference to FIG. 6B. Further, the sensors that are formed by unmasked portions of the electroconductive pattern 802 are similar to the sensors (e.g., sensors 642, 644) also described earlier with reference to FIG. 6B. For purposes of brevity, the unmasked portion of the electroconductive pattern 802 and sensitivity characteristics of sensors formed therefrom will not be described in further detail below.

Figure 9A:
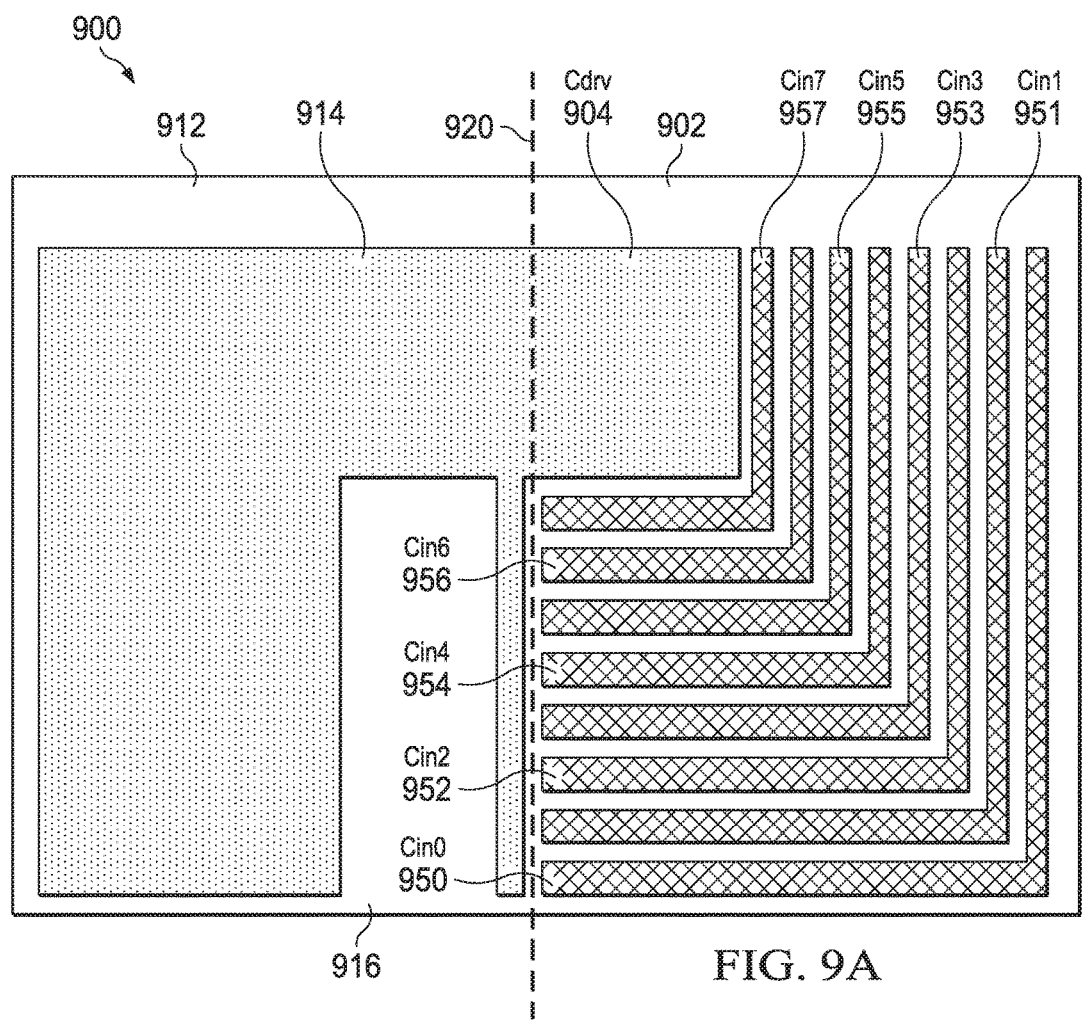
FIGS. 9A and 9B illustrate an example of masking an electroconductive pattern according to at least one embodiment.
Figure 9B:
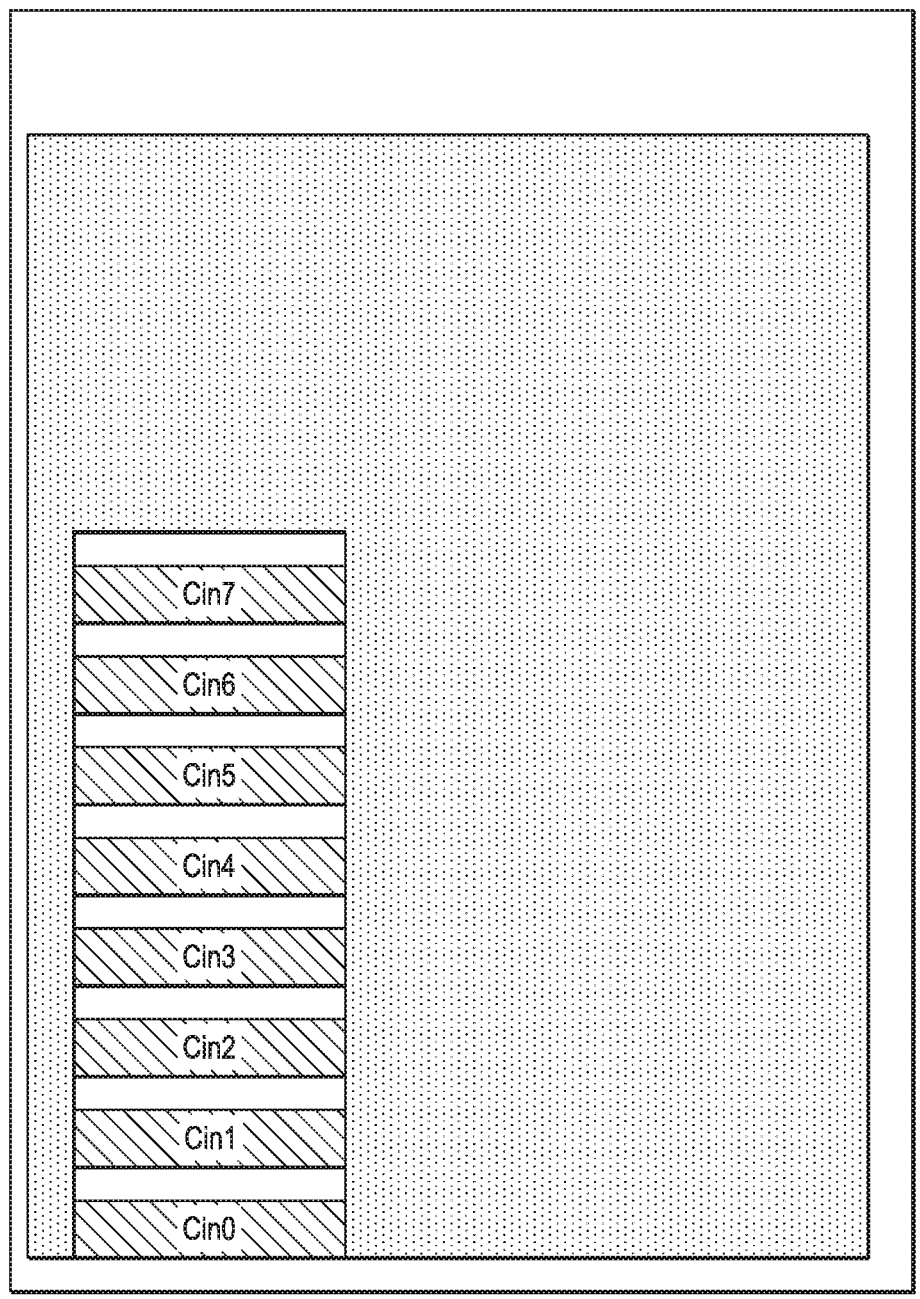

FIGS. 9A and 9B illustrate an example of masking an electroconductive pattern according to at least one embodiment. With reference to FIG. 9A, an electroconductive pattern 902 and an electroconductive pattern 912 are provided. The electroconductive pattern 902 is provided, for example, on a surface (e.g., planar surface) of an electroconductive film sheet (or a flexible sensor sheet) 900. The electroconductive pattern 912 is provided on the same surface of the sheet 900. For example, as illustrated in FIG. 9A, the electroconductive patterns 902 and 912 are provided adjacent each other on the sheet 900. The electroconductive patterns 902 and 912 may be formed by etching the film sheet 900 and/or by using any other known techniques.

The electroconductive pattern 902 forms various electrodes, including input electrodes Cin0, Cin1, Cin2, Cin3, Cin4, Cin5, Cin6 and Cin7, and drive electrode Cdrv 904. Input electrode Cin7 is smaller (e.g., shorter in length) than input electrode Cin6, which, in turn, is smaller than Cin5, etc. Input electrodes Cin0, Cin1, Cin2, Cin3, Cin4, Cin5, Cin6 and Cin7 are coupled, respectively, to lead-out electrodes 950, 951, 952, 953, 954, 955, 956 and 957.

The electroconductive pattern 912 forms drive electrode 914 and has a "door" 916. The sheet 900 is foldable. The electroconductive pattern 912 is configured to mask a portion of the electroconductive pattern 902 when the sheet 900 is folded at the dotted line 920 (see, e.g., FIG. 9B). The door 916 leaves portions of electrodes in the electroconductive pattern 902 unmasked.

The unmasked portion of the electroconductive pattern 902 is similar to the unmasked portion of the electroconductive pattern 602 that was described earlier with reference to FIG. 6A. However, unlike the unmasked portion of the electroconductive pattern 602, the unmasked portion of the electroconductive pattern 902 need not include any portions of a ground electrode. The electroconductive pattern 902 is masked by drive electrode 914 (rather than by a ground electrode similar to ground electrode 614 of FIG. 6A).

Further, the sensitivity of the sensors that are formed by unmasked portions of the electroconductive pattern 902 is similar to the sensitivity of the sensors (e.g., sensors 642, 644) also described earlier with reference to FIG. 6B. For purposes of brevity, the unmasked portion of the electroconductive pattern 902 and sensitivity characteristics of sensors formed therefrom will not be described in further detail below.

According to one or more embodiments, electroconductive patterns are provided on a sheet (e.g., electroconductive film sheet, sensor sheet) that is rollable. Such embodiments may be especially useful when placed inside a container that is at least partially round (e.g., a water bottle). Such embodiments may also be wrapped around the exterior surface of such a container.

Figure 10A:
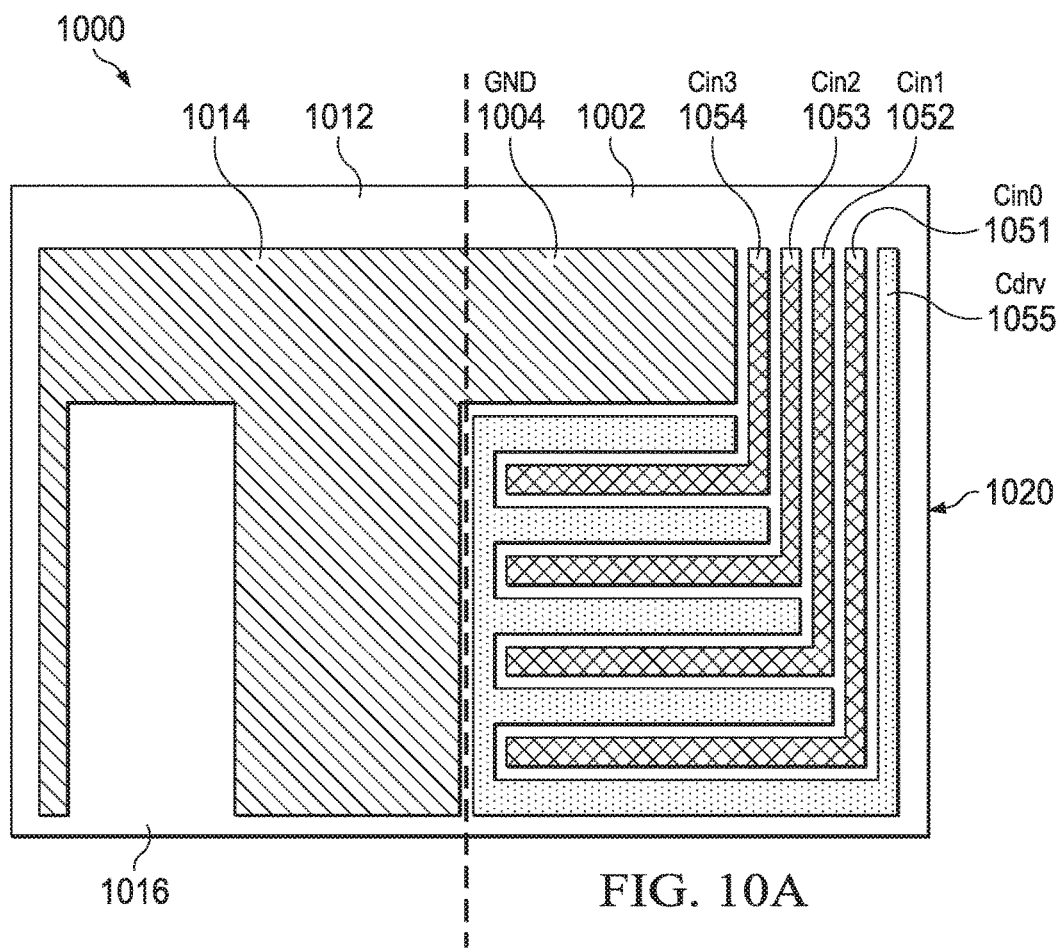
FIGS. 10A, 10B and 10C illustrate an example of masking an electroconductive pattern according to at least one embodiment.
Figure 10B:
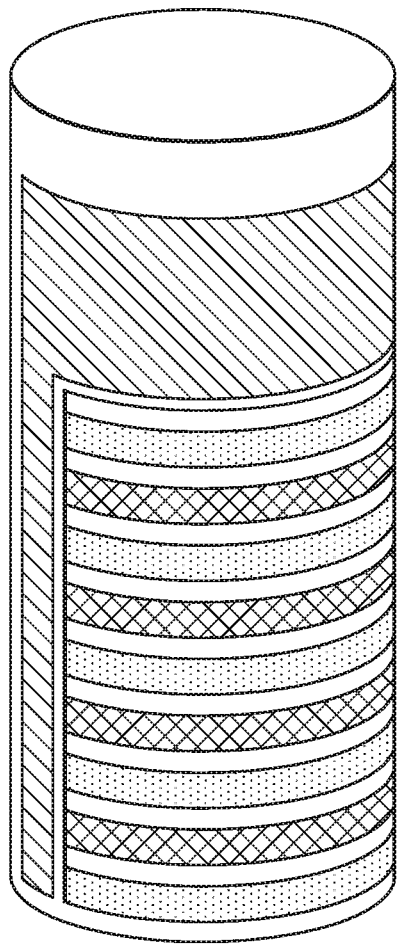
Figure 10C:
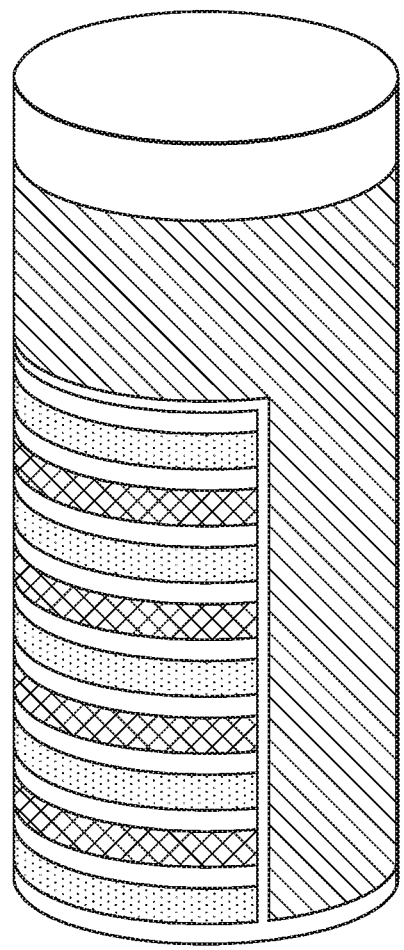

FIGS. 10A, 10B and 10C illustrate an example of masking an electroconductive pattern according to at least one embodiment. With reference to FIG. 10A, an electroconductive pattern 1002 and an electroconductive pattern 1012 are provided. The electroconductive pattern 1002 is provided, for example, on a surface (e.g., planar surface) of an electroconductive film sheet (or a flexible sensor sheet) 1000. The electroconductive pattern 1012 is provided on the same surface of the sheet 1000. For example, as illustrated in FIG. 10A, the electroconductive patterns 1002 and 1012 are provided adjacent each other on the sheet 1000. The electroconductive patterns 1002 and 1012 may be formed by etching the film sheet 1000 and/or by using any other known techniques.

The electroconductive pattern 1002 forms various electrodes, including input electrodes Cin0, Cin1, Cin2 and Cin3, drive electrode Cdrv, and ground electrode 1004. Input electrode Cin3 is smaller (e.g., shorter in length) than input electrode Cin2, which, in turn, is smaller than Cin1, which, in turn, is smaller than Cin0. Input electrodes Cin0, Cin1, Cin2 and Cin3 are coupled, respectively, to lead-out electrodes 1051, 1052, 1053 and 1054. Drive electrode Cdrv is coupled to lead-out electrode 1055.

The electroconductive pattern 1012 forms ground electrode 1014 and has a "door" 1016. The sheet 1000 is rollable. The electroconductive pattern 1012 is configured to mask a portion of the electroconductive pattern 1002 when the sheet 1000 is rolled (see, e.g., perspective views of FIGS. 10B and 10C). For example, edge 1020 of the sheet 1000 may, in a repeated manner, be rolled away from the reader and, then, towards the reader. The door 1016 leaves portions of electrodes in the electroconductive pattern 1002 unmasked.

The unmasked portion of the electroconductive pattern 1002 is similar to the unmasked portion of the electroconductive pattern 602 that was described earlier with reference to FIG. 6B. Further, the sensitivity of the sensors that are formed by unmasked portions of the electroconductive pattern 1002 are similar to the sensors (e.g., sensors 642, 644) also described earlier with reference to FIG. 6B. For purposes of brevity, the unmasked portion of the electroconductive pattern 1002 and sensitivity characteristics of sensors formed therefrom will not be described in further detail below.

Figure 11A:
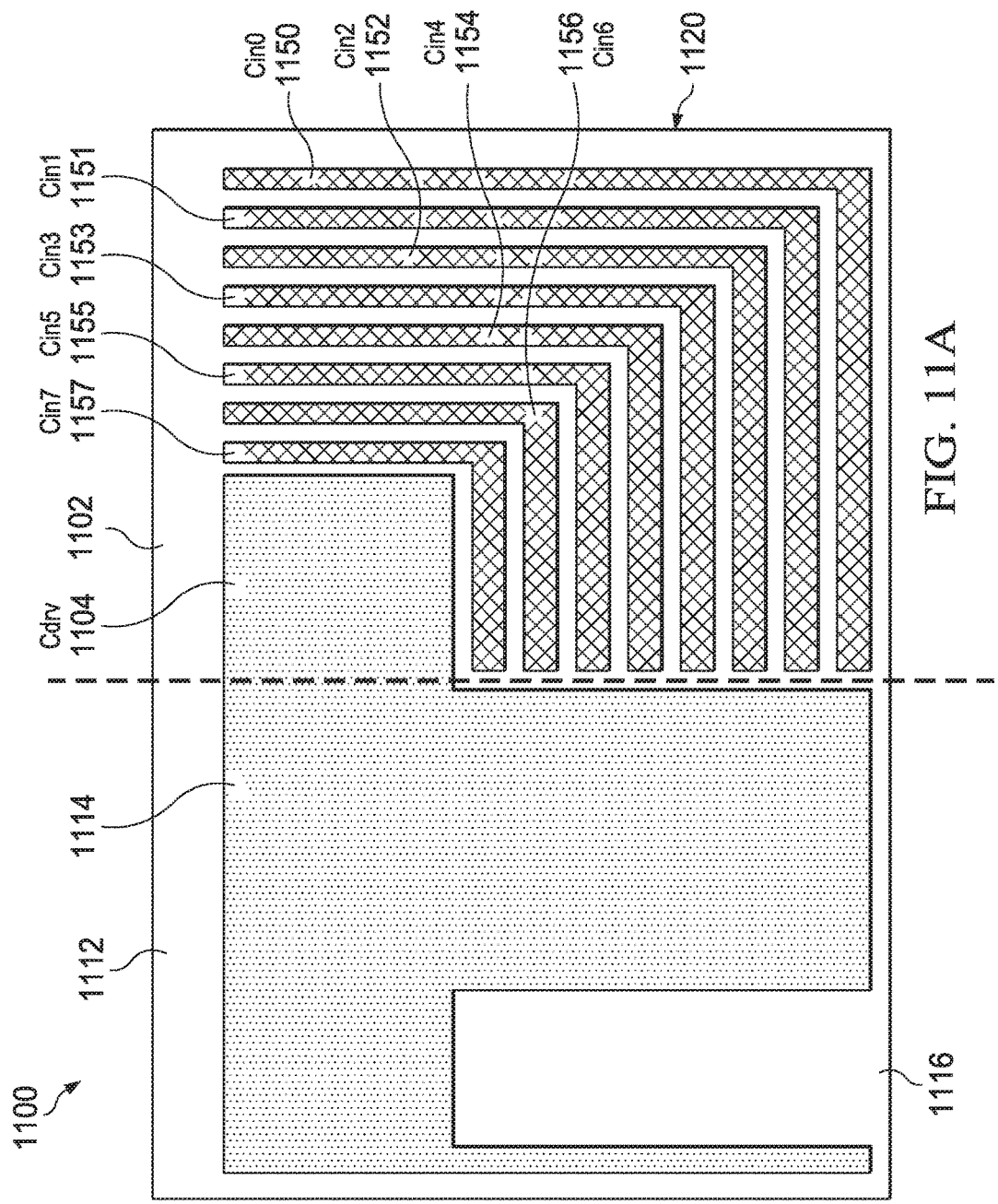
FIGS. 11A, 11B and 11C illustrate an example of masking an electroconductive pattern according to at least one embodiment.
Figure 11B:
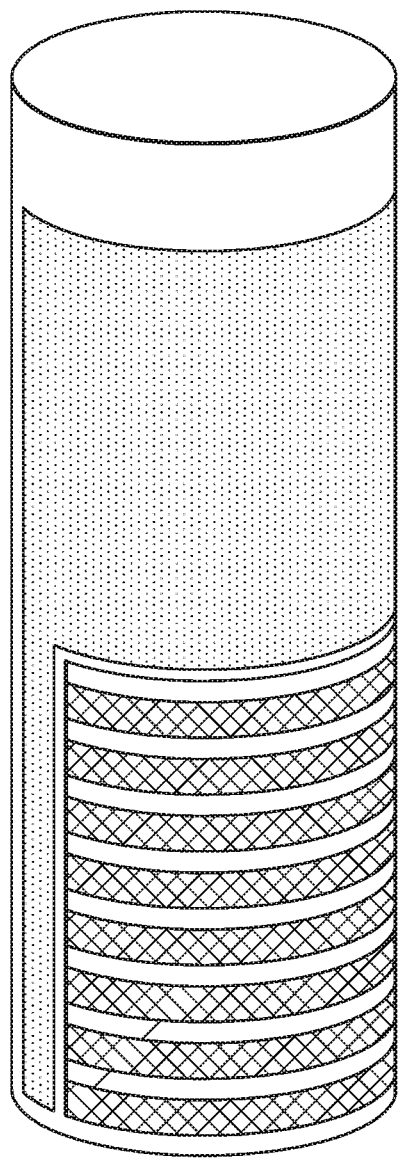
Figure 11C:
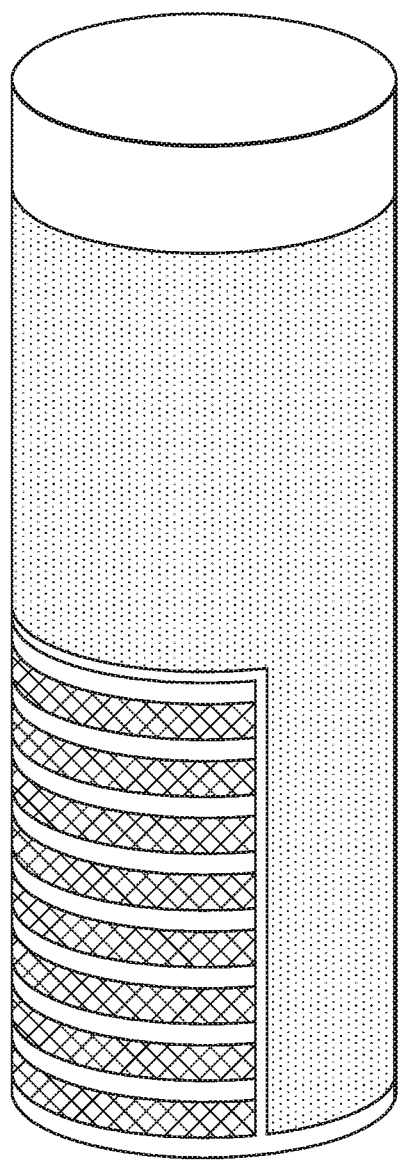

FIGS. 11A, 11B and 11C illustrate an example of masking an electroconductive pattern according to at least one embodiment. With reference to FIG. 11A, an electroconductive pattern 1102 and an electroconductive pattern 1112 are provided. The electroconductive pattern 1102 is provided, for example, on a surface (e.g., planar surface) of an electroconductive film sheet (or a flexible sensor sheet) 1100. The electroconductive pattern 1112 is provided on the same surface of the sheet 1100. For example, as illustrated in FIG. 11A, the electroconductive patterns 1102 and 1112 are provided adjacent each other on the sheet 1100. The electroconductive patterns 1102 and 1112 may be formed by etching the film sheet 1100 and/or by using any other known techniques.

The electroconductive pattern 1102 forms various electrodes, including input electrodes Cin0, Cin1, Cin2, Cin3, Cin4, Cin5, Cin6 and Cin7, and drive electrode Cdrv 1104. Input electrode Cin7 is smaller (e.g., shorter in length) than input electrode Cin6, which, in turn, is smaller than Cin5, etc. Input electrodes Cin0, Cin1, Cin2, Cin3, Cin4, Cin5, Cin6 and Cin7 are coupled, respectively, to lead-out electrodes 1150, 1151, 1152, 1153, 1154, 1155, 1156 and 1157.

The electroconductive pattern 1112 forms drive electrode 1114 and has a "door" 1116. The sheet 1100 is rollable. The electroconductive pattern 1112 is configured to mask a portion of the electroconductive pattern 1102 when the sheet 1100 is rolled (see, e.g., perspective views of FIGS. 11B and 11C). For example, edge 1120 of the sheet 1100 may, in a repeated manner, be rolled away from the reader, and, then, towards the reader. The door 1116 leaves portions of electrodes in the electroconductive pattern 1102 unmasked.

The unmasked portion of the electroconductive pattern 1102 is similar to the unmasked portion of the electroconductive pattern 602 that was described earlier with reference to FIG. 6A. However, unlike the unmasked portion of the electroconductive pattern 602, the unmasked portion of the electroconductive pattern 1102 need not include any portions of a ground electrode. The electroconductive pattern 1102 is masked by drive electrode 1114 (rather than by a ground electrode similar to ground electrode 614 of FIG. 6A).

Further, the sensitivity of the sensors that are formed by unmasked portions of the electroconductive pattern 1102 is similar to the sensitivity of the sensors (e.g., sensors 642, 644) also described earlier with reference to FIG. 6B. For purposes of brevity, the unmasked portion of the electroconductive pattern 1102 and sensitivity characteristics of sensors formed therefrom will not be described in further detail below.

Figure 12:
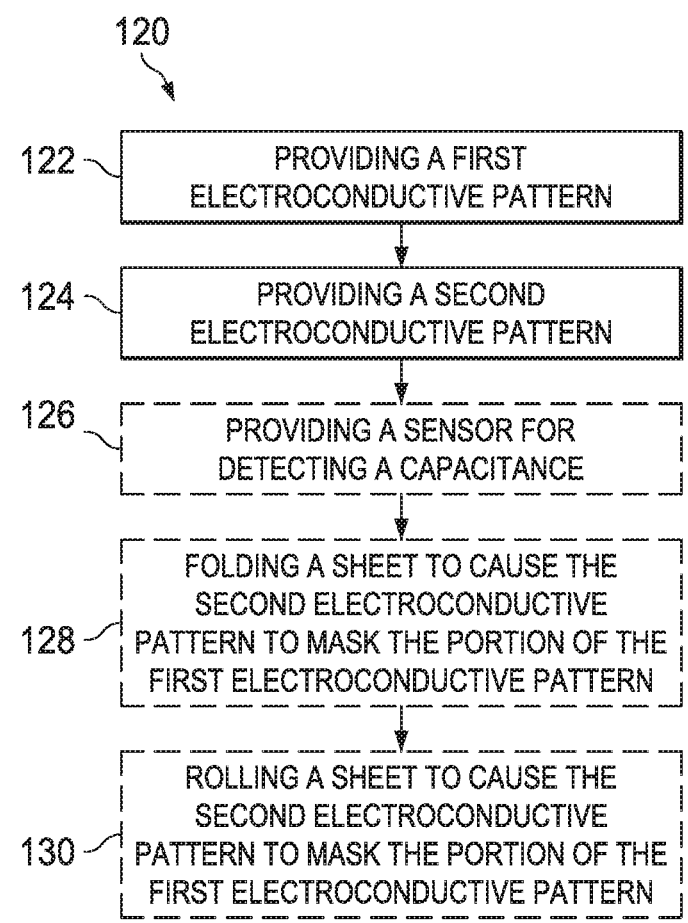
FIG. 12 is a flowchart of a method of providing a touch sensor according to at least one embodiment.

FIG. 12 is a flowchart 120 of a method of providing a touch sensor according to at least one embodiment.

At box 122, a first electroconductive pattern is provided (see, e.g., pattern 502 of FIG. 5A). The first electroconductive pattern includes at least two electrodes (e.g., input electrode and drive electrode; or input electrode, drive electrode and ground electrode).

At box 124, a second electroconductive pattern is provided (see, e.g., pattern 512 of FIG. 5A). The second electroconductive pattern is configured to mask a portion of the first electroconductive pattern when positioned over or under the first electroconductive pattern. An unmasked portion of the first electroconductive pattern includes unmasked portions of the at least two electrodes (see, e.g., portions 520, 522, 524, 526 and/or 528 of FIG. 5B). The unmasked portions are of approximately equal length.

At box 126, a sensor may be provided (see, e.g., device 2300 of FIG. 3). The sensor detects a capacitance formed by the first electrode (e.g., drive electrode Cdrv of FIG. 5A) and the second electrode (e.g., input electrode Cin0 of FIG. 5A).

At box 128, a sheet is folded to cause the second electroconductive pattern to mask the portion of the first electroconductive pattern (see, e.g., FIGS. 7, 8A, 8B, 9A, 9B).

At box 130, a sheet is rolled to cause the second electroconductive pattern to mask the portion of the first electroconductive pattern (see, e.g., FIGS. 10A, 10B, 10C, 11A, 11B, 11C). It is understood that the second electroconductive pattern may be caused to mask the portion of the first electroconductive pattern in ways other than folding or rolling. For example, as described earlier with reference to FIG. 5A, a substrate on which the second electroconductive pattern is provided may be positioned (e.g., stacked) on top of a substrate on which the first electroconductive pattern is provided.

Various aspects of the disclosure have been described with respect to flat panel touch sensors. It is understood that such aspects may be equally applicable with respect to transformed sensors. By masking a pattern of electrodes so that exposed portions of electrodes are approximately the same size, the sensitivity levels of capacitive sensors formed by the electrodes are brought closer to one another. In addition, various aspects of the disclosure have been described with respect to sheets such as electroconductive film sheets and/or flexible sensor sheets. It is understood that such sheets may be made of materials such as indium tin oxide (ITO), polyethylene terephthalate (PET), fluorinated polymer coating (FPC), gum materials, printed circuit board (PCB), and/or plastic materials.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A touch sensor comprising:
a first electroconductive pattern comprising at least two electrodes; and
a second electroconductive pattern configured to mask a portion of the first electroconductive pattern when positioned over or under the first electroconductive pattern, such that an unmasked portion of the first electroconductive pattern comprises unmasked portions of the at least two electrodes, the unmasked portions being of approximately equal length,
wherein:
the at least two electrodes comprise a first electrode and a second electrode;
an unmasked portion of the first electrode and a first unmasked portion of the second electrode are spaced apart by a first trace;
the unmasked portion of the first electrode and a second unmasked portion of the second electrode are spaced apart by a second trace; and
the first trace and the second trace are of approximately equal length.

2. The touch sensor of claim 1, further comprising:
a first lead-out electrode coupled to the first electrode; and
a second lead-out electrode coupled to the second electrode.

3. The touch sensor of claim 1, further comprising a sensor that detects a capacitance formed by the first electrode and the second electrode.

4. The touch sensor of claim 1, wherein the first electroconductive pattern and the second electroconductive pattern are disposed adjacent each other on a same planar surface of a sheet.

5. The touch sensor of claim 4, wherein the sheet comprises an electroconductive film sheet or a flexible sensor sheet.

6. A touch sensor comprising:
a first electroconductive pattern comprising at least two electrodes; and
a second electroconductive pattern configured to mask a portion of the first electroconductive pattern when positioned over or under the first electroconductive pattern, such that an unmasked portion of the first electroconductive pattern comprises unmasked portions of the at least two electrodes, the unmasked portions being of approximately equal length,
wherein:
the sheet is foldable; and
the first electroconductive pattern and the second electroconductive pattern are disposed adjacent each other on the same planar surface, such that folding the sheet causes the second electroconductive pattern to mask the portion of the first electroconductive pattern.

7. A touch sensor comprising:
a first electroconductive pattern comprising at least two electrodes; and
a second electroconductive pattern configured to mask a portion of the first electroconductive pattern when positioned over or under the first electroconductive pattern, such that an unmasked portion of the first electroconductive pattern comprises unmasked portions of the at least two electrodes, the unmasked portions being of approximately equal length,
wherein:
the sheet is rollable; and
the first electroconductive pattern and the second electroconductive pattern are disposed adjacent each other on the same planar surface, such that rolling the sheet causes the second electroconductive pattern to mask the portion of the first electroconductive pattern.

8. A method of providing a touch sensor, the method comprising:
providing a first electroconductive pattern comprising at least two electrodes; and
providing a second electroconductive pattern configured to mask a portion of the first electroconductive pattern when positioned over or under the first electroconductive pattern, such that an unmasked portion of the first electroconductive pattern comprises unmasked portions of the at least two electrodes, the unmasked portions being of approximately equal length,
wherein:
the at least two electrodes comprise a first electrode and a second electrode;
an unmasked portion of the first electrode and a first unmasked portion of the second electrode are spaced apart by a first trace;
the unmasked portion of the first electrode and a second unmasked portion of the second electrode are spaced apart by a second trace; and
the first trace and the second trace are of approximately equal length.

9. The method of claim 8, further comprising:
providing a first lead-out electrode coupled to the first electrode; and
providing a second lead-out electrode coupled to the second electrode.

10. The method of claim 8, further comprising providing a sensor that detects a capacitance formed by the first electrode and the second electrode.

11. The method of claim 8, wherein the first electroconductive pattern and the second electroconductive pattern are disposed adjacent each other on a same planar surface of a sheet.

12. The method of claim 11, wherein the sheet comprises an electroconductive film sheet or a flexible sensor sheet.

13. A method of providing a touch sensor, the method comprising:
providing a first electroconductive pattern comprising at least two electrodes; and
providing a second electroconductive pattern configured to mask a portion of the first electroconductive pattern when positioned over or under the first electroconductive pattern, such that an unmasked portion of the first electroconductive pattern comprises unmasked portions of the at least two electrodes, the unmasked portions being of approximately equal length,
wherein:
the sheet is foldable;
the first electroconductive pattern and the second electroconductive pattern are disposed adjacent each other on the same planar surface; and
the method further comprises folding the sheet to cause the second electroconductive pattern to mask the portion of the first electroconductive pattern.

14. A method of providing a touch sensor, the method comprising:
- providing a first electroconductive pattern comprising at least two electrodes; and
- providing a second electroconductive pattern configured to mask a portion of the first electroconductive pattern when positioned over or under the first electroconductive pattern, such that an unmasked portion of the first electroconductive pattern comprises unmasked portions of the at least two electrodes, the unmasked portions being of approximately equal length, wherein:
- the sheet is rollable;
- the first electroconductive pattern and the second electroconductive pattern are disposed adjacent each other on the same planar surface; and
- the method further comprises rolling the sheet to cause the second electroconductive pattern to mask the portion of the first electroconductive pattern.

* * * * *